United States Patent
Novati et al.

(10) Patent No.: US 11,551,321 B1
(45) Date of Patent: Jan. 10, 2023

(54) DYNAMIC EDUCATION PLANNING METHODS AND SYSTEMS

(71) Applicant: FORMATION LABS INC., San Francisco, CA (US)

(72) Inventors: Michael Lawrence Novati, San Francisco, CA (US); Sophie Zhou Novati, San Francisco, CA (US); David Tobias Silverman, Oakland, CA (US); Matthew Shawn Oates, Redwood City, CA (US)

(73) Assignee: FORMATION LABS INC., San Francisco, CA (US)

( * ) Notice: Subject to any disclaimer, the term of this patent is extended or adjusted under 35 U.S.C. 154(b) by 0 days.

(21) Appl. No.: 17/330,151

(22) Filed: May 25, 2021

(51) Int. Cl.
| | | |
|---|---|---|
| *G06Q 50/20* | (2012.01) | |
| *G06Q 10/10* | (2012.01) | |
| *G06F 16/901* | (2019.01) | |
| *G06N 20/00* | (2019.01) | |
| *G06N 5/00* | (2006.01) | |
| *G06Q 10/06* | (2012.01) | |

(52) U.S. Cl.
CPC ..... *G06Q 50/2053* (2013.01); *G06F 16/9024* (2019.01); *G06N 5/003* (2013.01); *G06N 20/00* (2019.01); *G06Q 10/063112* (2013.01); *G06Q 10/1097* (2013.01)

(58) Field of Classification Search
CPC ....... G06Q 50/2053; G06Q 10/063112; G06N 20/00; G06N 5/003; G06F 16/9024
See application file for complete search history.

(56) References Cited

U.S. PATENT DOCUMENTS

| | | | |
|---|---|---|---|
| 10,657,834 B2 | 5/2020 | Samuelson et al. | |
| 10,678,519 B2 | 6/2020 | Schwab | |
| 10,796,592 B2 | 10/2020 | Samuelson et al. | |
| 10,902,061 B2 | 1/2021 | Chen et al. | |
| 10,930,166 B2 | 2/2021 | Schlender et al. | |
| 2008/0166693 A1* | 7/2008 | Gifford | G09B 7/00 434/322 |
| 2009/0035733 A1* | 2/2009 | Meitar | G09B 7/00 434/118 |
| 2016/0133162 A1* | 5/2016 | Contractor | G09B 19/00 434/238 |
| 2016/0180248 A1* | 6/2016 | Regan | G09B 5/00 706/12 |

* cited by examiner

*Primary Examiner* — Mehmet Yesildag
*Assistant Examiner* — Ayanna Minor
(74) *Attorney, Agent, or Firm* — Marshall, Gerstein & Borun LLP

(57) ABSTRACT

A computing system for generating a dynamic path for a fellow, includes a processor and a memory storing instructions that when executed by the processor cause the computing system to receive the fellow's skill graph, receive a target skill, receive a calendar object and generate the dynamic path including a task and/or a session. A non-transitory computer readable medium includes program instructions that when executed, cause a computer to receive the fellow's skill graph, receive a target skill, receive a calendar object and generate the dynamic path including a task and/or a session. A method for generating a dynamic path for a fellow includes receiving the fellow's skill graph, receiving a target skill, receiving a calendar object and generating the dynamic path including a task and/or a session.

18 Claims, 19 Drawing Sheets

You are viewing Sophie Novati's Screen | View Options ⌄

WED 17 (4-5 Hours)

Sessions

Daily Standup -Team Vaughn
9:00am - 9:45am
+1

Adam <> Soudavone Check-in
1:30pm - 1:45pm

Mentor Led Group Take Home
2:00pm - 1:45pm

Pair Learning (Three Number Sum)
3:00pm - 3:45pm

Pair Learning (Coin Change Number of Ways)
5:00pm - 5:45pm

Tasks / 5 Remaining

Pair Learning (Three Number Sum) Scoredcard
Due Tomorrow  Est 10m

Pair Learning (Coin Change Number of ways) Scoredcard
Due Tomorrow  Est 10m

Learn Algo: Making Change (Number of Ways)
Due Wednesday ▷ Est. 25m-1h 40m

Team Bonding: Host a Happy Hour!
Due end of week  Est. None

Team Bonding: Host a Happy Hour!
Due March 5  Est. None

THU 18 (8-10 Hours)

Sessions

Daily Standup -Team Vaughn
9:30am - 9:45am
+1

Pair Learning (Implement Strstr)
3:00pm - 3:45pm

Pair Learning (Longest Substring with K Distinct Characters)
5:00pm - 5:45pm

Tasks / 6 Remaining

Prepare for Connect 4 Front End (Pair Take Home)
Due March 12 ▷ 0m 6s / Est. 1h - 1h 30m Learn Algo: Longest Substring with At Most K Characters
Due Thursday ▷ Est 25m - 1h 40m Prepare for Pair Learning: Implement Strstr
Due Thursday ▷ Est. 20m-30m Pair Learning (Implement Strstr) Scorecard
Due Thursday  Est. 10m Pair Learning (Longest Substring with K Distinct Characters Scorecard
Due Thursday  Est. 10m Redo the Top 50 Universities Take Home Assignment
Due end of week ▷ Est. 4h Participants 5 | Chat | Share Screen | Record | Reactions

FIG. 3A (Cont.)

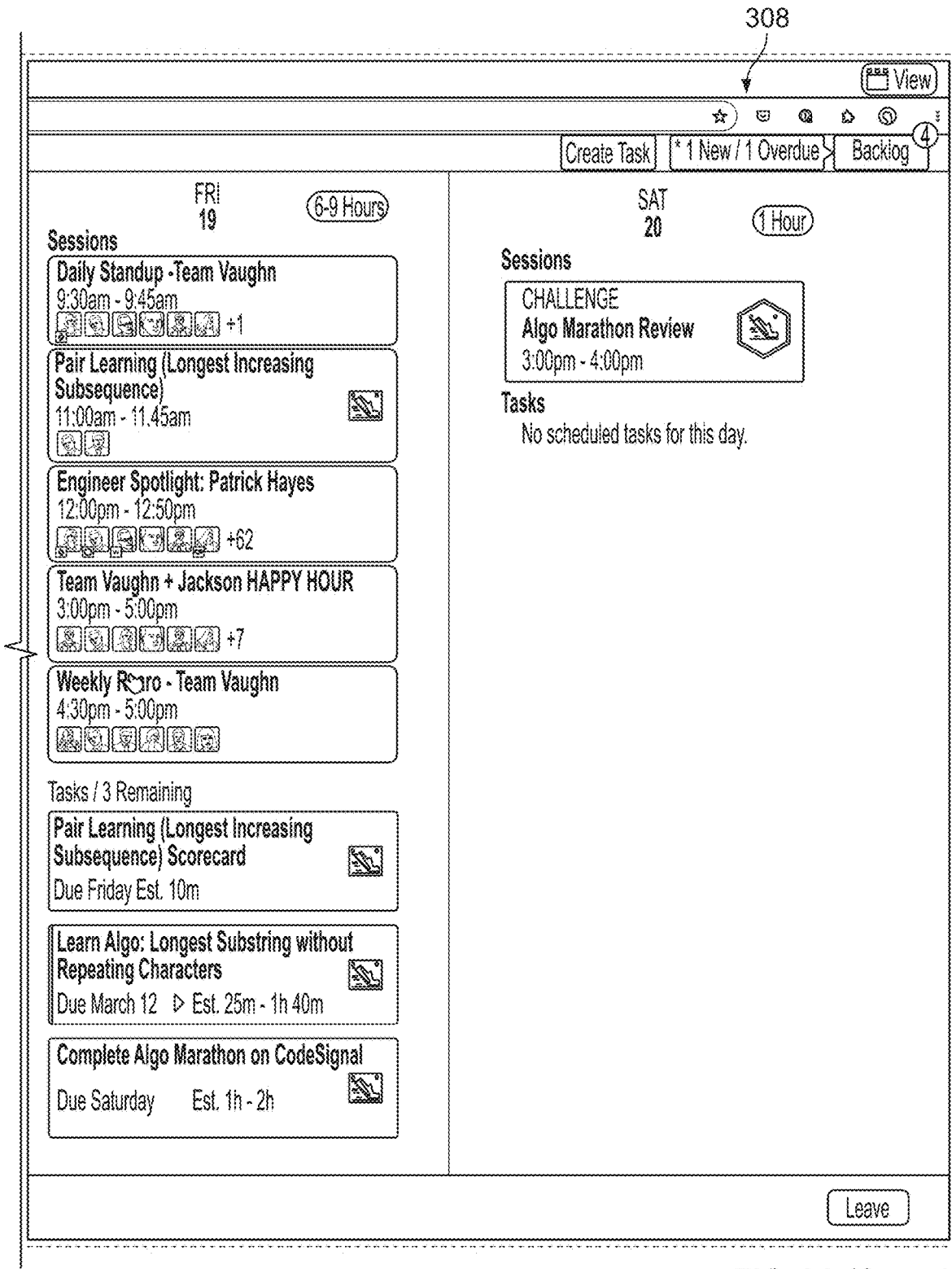
FIG. 3A (Cont.1)

You are viewing Sophie Novati's Screen | View Options ⌄    320

Mentor Led Group 324
Take Home 322-B
2:00pm - 3:00pm | Wednesday, March 17th

Host
Charles George
Lead Instruction Engineer

John Smith

William Jack

Thomas Harry

James Charley

Info    Plan    Scorecard ④

Session Plan  ⊚ Host Only
Stock Market — 340
The purpose of this session is to help Level 1 Fellows gain confidence working on small scale applications, They will practice making simple architectural design choices, coding under time pressure while getting feedback and tips to improve their coding and debugging skills.

1. Give the question prompt (3-5m)  — 342
Link to the prompt (not meant to be seen by Fellows):
https://coda.io/d/Mentor-Handbook_dCCsAkrAoa.J/Stock-Market_su4Z_#_IuKRF 2. Talk through architectural design (~10m)  — 344
 - Rotate through Fellows and ask them to make suggestions for components and data models that are needed
 - These projects will be very simple, so most likely we will only need a simple data model, maybe light networking, etc.
 - Take notes and make a list of these components
 - Ask Fellows to defend their choices
 - Be flexible on different approaches but if there's a definitively stronger choice to make, suggest it.

3. Rotating through Fellows, code up the solution together (~45m)  — 346
 - Rotate through Fellows, allowing them ~5 minutes each to code. It's ok if they are mid thought when it's 5 minutes, it helps Fellows to have to start the code from where another Fellow.
 - In the spirit of time, it is ok to help Fellows along in order to try to get to a more complete solution by the end of the session; it's best to help Fellows out in between rotating.
 - As Fellows code up each component and class, ask them to test their code through console logs, inspecting, and using other debugging tools.

4. (bonus) If there's any additional time, feel free to use it  — 348
to discuss alternative solutions and weigh their pros and cons.

Participants 5 | Chat | Share Screen | Record | Reactions

DYNAMIC EDUCATION PLANNING METHODS AND SYSTEMS

The present disclosure is generally directed to dynamic education planning methods and systems, and in particular, to methods and systems for providing adaptive learning services to one or more student-fellows.

BACKGROUND

Students in many fields (e.g., software engineering, medicine, trades, etc.) follow a conventional path to their respective industry practice, or general learnings. For example, a software engineer may study computer science as an undergraduate and/or graduate student at a university. Such engineers may also study adjacent topics, such as mathematics and logic. Employers that hire software engineers are often highly integrated with universities, and numerous career pipelines from the academy to private industry are fostered through this integration. Engineers who follow the conventional path to a career in software development move through traditional educational channels, and are afforded opportunities with technology companies (e.g., externships, internships, consulting contracts, sponsored research, etc.). Thus, traditional software engineers are strongly represented in the ranks of the world's most competitive technology companies.

It has been said that software is eating the world. Thus, an increasing number of people, in all industries, are coming to the realization that software engineering skills are highly sought after, and sometimes necessary, for achieving career success. As such, many people find themselves following circuitous routes to the practice of software engineering. In fact, the skills of some individuals from non-traditional software engineering backgrounds may surpass those of their traditionally-trained software engineering peers. However, skills attainment and skills refinement remains an unmet problem in many industries.

For this second group of individuals (e.g., those who have interdisciplinary educational backgrounds, or who come to their fields as a second career later in life, or who are more junior, etc.) existing educational techniques are lacking. By and large, this second group consists of people who are unwilling or unable to matriculate as traditional students. Several existing services provide online courses intended to replace traditional curriculum, but the fact remains that the second group lacks the holistic support network found in the aforementioned career pipelines. This is true in software engineering and in other fields of study.

For another example, a medical student may follow a course of study that requires the student to meet certain initial technical standards for matriculation, as well as ongoing requirements, and ultimately, still further requirements for graduation. Such requirements may include, for example, observational skills, communication skills, motor skills, intellectual skills, and behavioral/social skills. Like the aspiring engineer, the aspiring medical professional may not take a direct path to medical school, and as such, this student may be at a disadvantage relative to conventional peers.

A student seeking to learn a skill (e.g., software engineering, reading X-rays, driving a car, welding, etc.) can participate in a university's massive open online course (MOOC) to learn a specific curriculum facet. Some of this open coursework may even result in a degree or other certification. For example, in the context of computer science, existing services may assist the student in learning the first few steps of learning to code. An electrician may learn some basic information about electrical circuits via a non-conventional educational source. A medical student may find information online. However, these services may not provide the student with the level of skill needed to operate in a top tier tech company, as a licensed electrician, a surgeon, etc. Moreover, existing educational services are focused on technical fundamentals, to the exclusion of other skills that are required for the student to be competitive in the ranks of peers in conventional educational programs. Still further, conventional educational paths may include cultural and/or institutional biases that result in disparate selection/hiring practices, and under-representation in industry. Thus, there is a strong industry-wide need to improve techniques and systems for providing adaptive skills-based learning services.

BRIEF SUMMARY

In one aspect, a computing system includes one or more processors; and one or more memories storing instructions. When executed by the one or more processors, the instructions cause the computing system to (i) receive a skill graph corresponding to the fellow; (ii) receive a set of one or more target skills; (iii) receive a synchronous calendar object; and (iv) generate the dynamic path including one or both of (a) at least one task, and (b) at least one session.

In another aspect, a computer-implemented method of generating a dynamic path for a fellow includes (i) receiving a skill graph corresponding to the fellow; (ii) receiving a set of one or more target skills; (iii) receiving a synchronous calendar object; and (iv) generating the dynamic path including one or both of (a) at least one task, and (b) at least one session.

In yet another aspect, a non-transitory computer readable medium contains program instructions that when executed, cause a computer to (i) receive a skill graph corresponding to the fellow; (ii) receive a set of one or more target skills; (iii) receive a synchronous calendar object; and (iv) generate the dynamic path including one or both of (a) at least one task, and (b) at least one session.

BRIEF DESCRIPTION OF THE FIGURES

The figures described below depict various aspects of the system and methods disclosed therein. It should be understood that each figure depicts one embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

Figure 1:
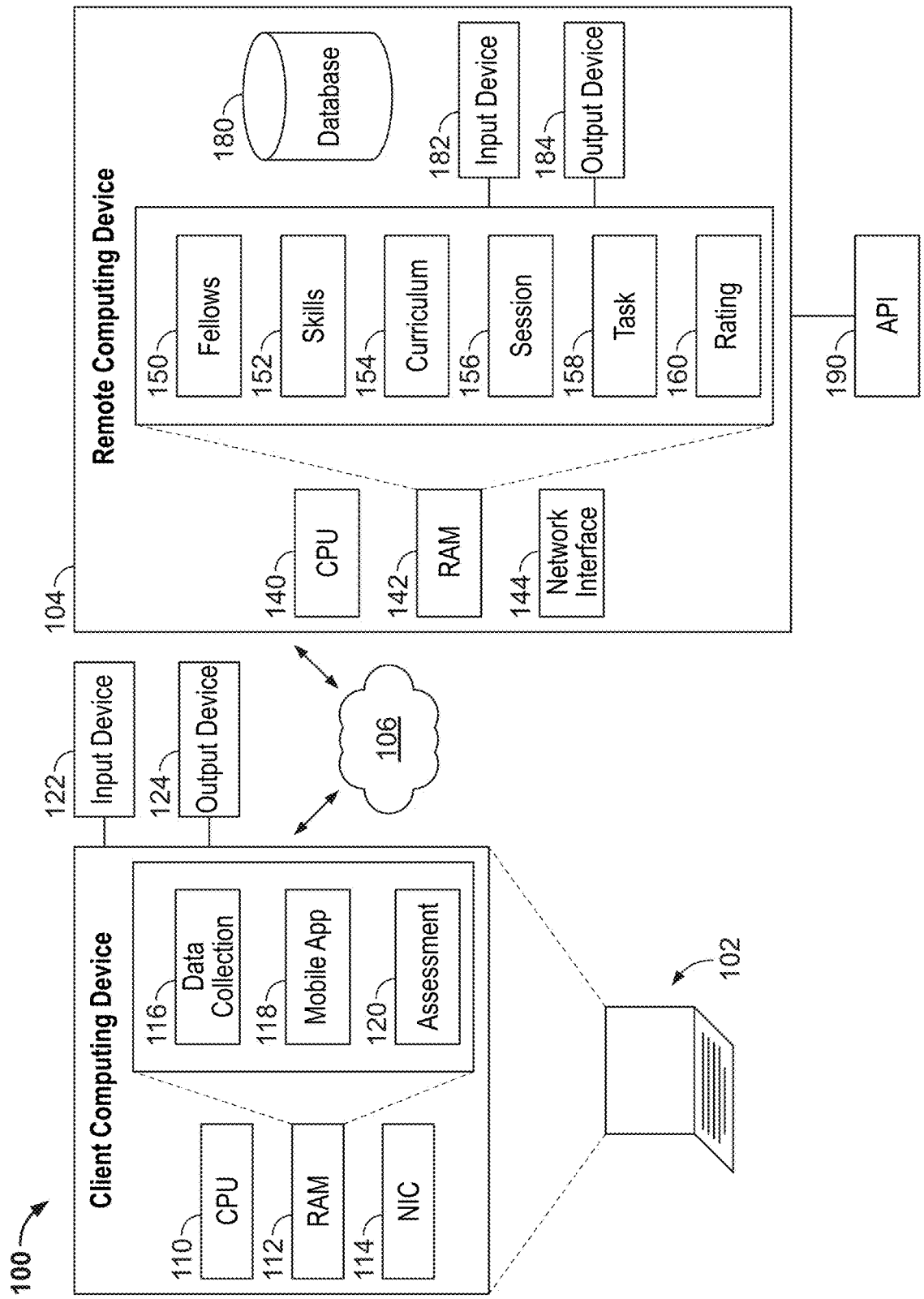
FIG. 1 depicts an exemplary computing environment, according to an embodiment.

The figures depict preferred embodiments for purposes of illustration only. One of ordinary skill in the art will readily recognize from the following discussion that alternative embodiments of the systems and methods illustrated herein may be employed without departing from the principles of the invention described herein.

DETAILED DESCRIPTION

Overview and Advantages

The present disclosure is generally directed to dynamic education planning methods and systems, and in particular, to methods and systems for providing adaptive learning services to one or more students (i.e., to one or more fellows). The dynamic adaptive learning techniques disclosed herein may include heuristic-based techniques, and/or techniques that utilize various aspects of machine learning and/or artificial intelligence. The work of fellows may be supervised by fellowship managers (also known herein as mentors). Advantageously, the present techniques may combine skills matching, relative skills ratings and mentor feedback to generate an accurate representation of multiple fellow skills, across a variety of categories.

Generally, the present techniques enable the student (also referred to in this disclosure as a fellow) to participate in an online educational platform that prepares the student/fellow to gain the skills and experience necessary to work in a particular industry (e.g., as a software engineer, database administrator, front-end designer, medical professional, etc.). For example, the present techniques may prepare the fellow to learn the skills to work at a modern tech company (e.g., Facebook, Google, etc.), a hospital, in a competitive trade, etc. In the case of software engineers, for example, it will be appreciated by those of skill in the art that such companies' hiring practices are notoriously rigorous, and require the prospective hire to have hard science skills (e.g., knowledge of data structures, algorithms, discrete mathematics, etc.) as well as "soft" skills (e.g., those skills assessed during behavioral interviews). Thus, the present techniques improve on conventional techniques that teach only a limited set of skills required for success as a software developer at a modern tech company, using a data-driven and algorithm-based approach to assessing software engineering competency. Likewise, the present techniques are adaptable to the career goals of students in any field.

The present techniques enable each fellow to chart a unique, dynamic path to skills acquisition by a number a different techniques. In some embodiments, the present techniques include mentoring by fellowship managers. The present techniques may include benchmarking according to skills known to be desired by one or more employers. The fellow may select a career goal (e.g., a target job title, a target company, etc.), which is associated with a number of required skills. The present techniques may include assessing the fellow's competency with respect to the required skills, and may compute one or more optimal paths forward for the fellow to achieve the fellow's unique goals, wherein the paths are based on the fellow's assessed competency. Over time, the fellow's progress may be continually reassessed, and rated, using a persistent data structure to store, represent and update the fellow's progress. Specifically, the fellow's skills may be individually rated with respect to different categories, and the fellow's skill may be rated in the aggregate.

In some embodiments, a rating system for calculating relative skill levels of one or more fellows may be used. For example, in some cases, a modified form of the Elo rating system, popular for rating players in games of skill (e.g., chess players), may be used to rate fellows' respective skill levels. The modified Elo rating algorithm used in the present techniques may include a rating update formula that accounts for skill decay when traversing the skill graph, and also for amplifying the effects of ratings for successful completion of certain tasks/sessions.

The present techniques also include methods and systems for determining the path, or plan, that a given fellow should take, in terms of which tasks and/or sessions the fellow should perform, as well as techniques for integrating those tasks/sessions into a calendar object. Some embodiments of the present techniques include one or more graphical user interfaces via which the users of the present techniques (e.g., fellows, fellowship managers/mentors, system administrators, etc.) may access aspects of the present techniques. In still further embodiment, the present techniques may include matching skills.

For example, one or more fellows may be matched to one or more mentors based on a respective individual skill level and/or an aggregate skill level. One or more fellows may be matched to one or more skill, based on a respective skill level/rating. One or more mentors may be matched to one or more skill, based on a respective skill level/rating. Further, multiple skills may be matched together based on a respective skill level/rating. For example, multiple skills may be selected from a skills graph of a user based on the skill level of each individual skill (e.g., all skills within ten points of one another may be selected). Similarly, one or more mentors and/or one or more fellows may be matched to one or more tasks based on a respective skill rating of the mentor/fellow and/or a respective skill rating of the one or more tasks. One or more mentors and/or one or more fellows may be matched to one or more session based on a respective skill rating of the mentor/fellow and/or a respective skill rating of the one or more session. For example, the matching may be performed by comparing one or more data structures.

Exemplary Computing Environment

FIG. 1 depicts an exemplary computing environment 100 in which the techniques disclosed herein may be implemented, according to an embodiment.

The environment 100 includes a client computing device 102, a remote computing device 104, and a network 106. Some embodiments may include a plurality of client computing devices and/or a plurality of remote compute devices. For example, one or more mentors and/or one or more fellows may each use a respective client computing device 102 to access one or more remote computing devices 104.

The client computing device 102 may be an individual server, a group (e.g., cluster) of multiple servers, or another suitable type of computing device or system (e.g., a collection of computing resources). For example, the client computing device 102 may be a mobile computing device (e.g., a server, a mobile computing device, a smart phone, a tablet, a laptop, a wearable device, etc.). In some embodiments the client computing device 102 may be a personal portable device of a user. For example, the client computing device 102 may be the property of a fellow, a mentor, the purveyor of the present techniques, etc.

The client computing device 102 includes a processor 110, a memory 112 and a network interface controller (NIC) 114. The processor 110 may include any suitable number of processors and/or processor types, such as CPUs, one or more graphics processing units (GPUs), etc. Generally, the processor 110 is configured to execute software instructions stored in a memory 112. The memory 112 may include one or more persistent memories (e.g., a hard drive/solid state memory) and stores one or more set of computer executable instructions/modules, including a data collection module 116, a mobile application module 118, and an assessment module 120, as described in more detail below. More or fewer modules may be included in some embodiments. The NIC 114 may include any suitable network interface controller(s), such as wired/wireless controllers (e.g., Ethernet controllers), and facilitate bidirectional/multiplexed networking over the network 106 between the client computing device 102 and other components of the environment 100 (e.g., another client computing device 102, the remote computing device 104, etc.).

The one or more modules stored in the memory 112 may include respective sets of computer-executable instructions implementing specific functionality. For example, in an embodiment, the data collection module 116 includes a set of computer-executable instructions for collecting data from the client computing device 102. The collected data may include, for example, answers to homework problems, registration information, computer code, homework assignments, etc.

The mobile application module 118 may include computer-executable instructions that receive user input via the input device 122 and/or display one or more graphical user interfaces (GUIs) on the output device 124. For example, the mobile application module 118 may correspond to a mobile computing application (e.g., an Android, iPhone, or other) computing application of a remote Fellowship company. The mobile computing module 118 may display graphical user interfaces such as those depicted in FIG. 3A, FIG. 3B, FIG. 3C and FIG. 3D, for example.

The mobile computing application 118 may be a specialized application corresponding to the type of computing device embodied by the client computing device 102. For example, in embodiments where the client computing device 102 is a mobile phone, the mobile application module 118 may correspond to a mobile application downloaded for iPhone. When the client computing device 102 is a tablet, the mobile application module 118 may correspond to an application with tablet-specific features. Exemplary GUIs that may be displayed by the mobile application module 118, and with which the end user may interact, are discussed below.

The mobile application module 118 may include instructions for receiving/retrieving mobile application data from the remote computing device 104. In particular, the mobile application module 118 may include instructions for transmitting user-provided login credentials, receiving an indication of successful/unsuccessful authentication, and other functions related to the user's operation of the mobile application. The mobile application module 118 may include instructions for receiving/retrieving, rendering, and displaying information in a GUI. Specifically, the application module 118 may include computer-executable instructions for displaying a calendar view including the schedule of a fellow participating in the Fellowship.

In some embodiments, the assessment module 120 may include computer-executable instructions for executing one or more questions related to a computer task. The task may comprise one or more questions that include multiple choice or freeform answers. In some embodiments, the assessment module 120 may include instructions for evaluating answers (e.g., prose answers, computer program/code answers, multiple choice answers, etc.) provided by and end user of the client computing device 102. In the case of computer code, the evaluation may include determining whether the code passes certain tests (e.g., asymptotic behavior, cyclomatic complexity, wall clock time, memory usage, stack utilization, output, memory addressing, etc.). The assessment module 120 may transmit results of such tests to the remote computing device 104.

In some embodiments, one or more components of the computing device 102 may be embodied by one or more virtual instances (e.g., a cloud-based virtualization service). In such cases, one or more client computing device 102 may be included in a remote data center (e.g., a cloud computing environment, a public cloud, a private cloud, etc.). For example, a remote data storage module (not depicted) may remotely store data received/retrieved by the computing device 102. The client computing device 102 may be configured to communicate bidirectionally via the network 106 with the remote computing device 104. The client computing device 102 may receive/retrieve data (e.g., assessment testing data, session data, etc.) from the remote computing device 104, and/or the client computing device 102 may transmit data (e.g., fellow responses, graphical user interface selections, etc.) to the remote computing device 104.

The client computing device 102 includes an input device 122 and an output device 124. The input device 122 may include any suitable device or devices for receiving input, such as one or more microphone, one or more camera, a hardware keyboard, a hardware mouse, a capacitive touch screen, etc. The output device 124 may include any suitable device for conveying output, such as a hardware speaker, a computer monitor, a touch screen, etc. In some cases, the input device 122 and the output device 124 may be integrated into a single device, such as a touch screen device that accepts user input and displays output. The client computing device 102 may be associated with (e.g., leased, owned, and/or operated by) an Fellowship company. As noted, in some embodiments, the client computing device 102 may be a mobile computing device of an end user (e.g., a laptop computer).

The network 106 may be a single communication network, or may include multiple communication networks of one or more types (e.g., one or more wired and/or wireless local area networks (LANs), and/or one or more wired and/or wireless wide area networks (WANs) such as the Internet). The network 106 may enable bidirectional communication between the client computing device 102 and the remote computing device 104, or between multiple client computing devices 102, for example.

The remote computing device 104 includes a processor 140, a memory 142, and a NIC 144. The processor 140 may include any suitable number of processors and/or processor types, such as CPUs and one or more graphics processing units (GPUs). Generally, the processor 140 is configured to execute software instructions stored in the memory 142. The memory 142 may include one or more persistent memories (e.g., a hard drive/solid state memory) and stores one or more set of computer executable instructions/modules, as discussed below. For example, the remote computing device 104 may include a fellows module 150, a skills module 152, a curriculum module 154, a session module 156, a task module 158 and a rating module 160. More or fewer modules may be included in the memory 142, in some embodiments.

The NIC 144 may include any suitable network interface controller(s), such as wired/wireless controllers (e.g., Ethernet controllers), and facilitate bidirectional/multiplexed networking over the network 106 between the remote computing device 104 and other components of the environment 100 (e.g., another remote computing device 104, the client computing device 102, etc.). In some embodiments, multiple client computing device 102 belonging to multiple end users (e.g., multiple fellows) may be simultaneously communicatively coupled to the remote computing device 104.

The one or more modules stored in the memory 142 may include respective sets of computer-executable instructions implementing specific functionality.

The fellows module 150 may include instructions for creating, accessing, updating and deleting information related to fellows, mentors, and other users of the environment 100. For example, the fellows module 150 may include instructions for querying an electronic database to retrieve demographic information related to a fellow.

The skills module 152 may include instructions for creating, accessing, updating, and deleting information in one or more skills graphs, as discussed below. For example, the skills module 152 may be used to generate and/or modify the skills data structure depicted in FIG. 2B. The skills module 152 may be integrated with the fellows module 150 in a many-to-many relationship. That is, many fellows may be related to many skills graphs. For example, any fellow participating in the fellowship program and using the environment 100 may have a weekly skills graph. Or, the fellow may have a first skills graph for tracking Python programming skills and a second for JavaScript programming skills. The skills module 152 may also include instructions for merging these multiple skills graphs into a single graph, in some embodiments. The skills module 152 may be used to query users, given one or more node identifiers (e.g., a primary key). The skills module 152 may include further instructions for serializing and deserializing skills graphs for storage (e.g., in a pickled data structure, in an electronic database, etc.).

The curriculum module 154 includes similar functionality to the skills module 152. Whereas the skills module 152 is used to manipulate skills graph(s), the curriculum module 154 includes instructions for manipulating one or more curriculum graphs. The curriculum module may include instructions for analyzing a skills graph to weight the nodes in a curriculum graph. The curriculum module 154 may include instructions for creating tasks and sessions, in some embodiments.

The session module 156 may include instructions for creating session objects. Session objects may include session attributes, such as the mentor name, one-to-many relationship of session to fellowship participants, session instructions, session homework, session grades/ratings for individual fellows, etc. The session module 156 may include instructions for updating skills rating of the fellow's skills graph when the fellow correctly (or incorrectly) completes a session. The session module 156 may independently update one or more skills of the user by, for example, updating the skills graph of the user to affect the user's ratings. The session module 156 may include instructions for retrieving and storing information in an electronic database.

The task module 158 includes instructions for loading, operating and grading tasks. Generally, a task is any assignment that can be provided to a fellow and for which the fellow can receive a grade (e.g., a pass-fail score, a percentage score, a ranged score from A-F, a score represented as a real number from 0 to 1, etc.). The task module 158 may include instructions for storing task information in the electronic database. For example, the task module 158 may include an indication that a fellow has successfully completed a task, the time to completion, the number of questions answered correctly, the answers themselves, etc.

The rating module 160 includes instructions for rating skills of the fellow in a skills graph, skills of the fellowship manager/mentor in a skills graph, and skills in the curriculum graph. As discussed below, the rating module 160 may include instructions for analyzing ratings using a ratings system such as the Elo rating system. For example, the rating module 160 may compute the fellow's skill rating with respect to a particular specific skill (e.g., merge sort) or a broader category (sorting algorithms). Each skill represented as a node in the skill graph may be independently rated by the rating module 160.

The modules included in the memory 142 may include in instructions for rendering, displaying and/or presenting one or more GUIs via an output device. Exemplary GUIs are depicted below.

It should be appreciated that additional modules may be included, in some embodiments. For example, some embodiments may include a machine learning module (not depicted). The machine learning (ML) module may include instructions for training and/or operating one or more ML models. In supervised learning embodiments, training may include training an artificial neural network (ANN). This training may include establishing a network architecture, or topology, adding layers including activation functions for each layer (e.g., a "leaky" rectified linear unit (ReLU), softmax, hyperbolic tangent, etc.), loss function, and optimizer. In an embodiment, the ANN may use different activation functions at each layer, or as between hidden layers and the output layer. A suitable optimizer may include Adam and Nadam optimizers. In an embodiment, a different neural network type may be chosen (e.g., a recurrent neural network, a deep learning neural network, etc.).

Training data may be divided into training, validation, and testing data. For example, 20% of the training data set may be held back for later validation and/or testing. In that example, 80% of the training data set may be used for training. In that example, the training data set data may be shuffled before being so divided. Data input to the ANN may be encoded in an N-dimensional tensor, array, matrix, and/or other suitable data structure. In some embodiments, training may be performed by successive evaluation (e.g., looping) of the network, using training labeled training samples. The process of training the ANN may cause weights, or parameters, of the ANN to be created. The weights may be initialized to random values. The weights may be adjusted as the network is successively trained, by using one of several gradient descent algorithms, to reduce loss and to cause the values output by the network to converge to expected, or learned, values. In an embodiment, a regression may be used which has no activation function. Therein, input data may be normalized by mean centering, and a mean squared error loss function may be used, in addition to mean absolute error, to determine the appropriate loss as well as to quantify the accuracy of the outputs. The data used to train the ANN may include ratings data, task data, session data, etc. In some embodiments, multiple ANNs may be separately trained and/or operated (e.g., by using a separate ML operation module in the memory 142).

In unsupervised learning embodiments, the machine learning module may include instructions for finding previously-unknown patterns. For example, the machine learning module may receive skills graph data and/or curriculum data. The machine learning module may analyze data and predict (i.e., classify or cluster) a task or session for a user to perform, based upon one or more features included within the skills graph of the fellow. The features may differ, depending on the embodiment. For example, in one embodiment, the features may be a plurality of attributes, or properties, present in the skills graph. The predefined categories may correspond to different skill categories.

In some embodiments, the present techniques may include using a machine learning framework (e.g., TensorFlow, Keras, scikit-learn, etc.) to facilitate the training and/or operation of machine learning models. The machine learning module may store and/or retrieve one or more unsupervised and/or supervised model in an electronic database, along with related data such as features, category identifiers (e.g., one or more fellow identifiers, skill identifiers, etc.). The machine learning module may store output produced during the operation of the one or more ML models (at training time and/or during operation of the ML models) in the electronic database.

The remote computing device 104 may further include one or more databases 180, an input device 182, an output device 184 and an API 190. The database 180 may be implemented as a relational database management system (RDBMS) in some embodiments. For example, the data store 180 may include one or more structured query language (SQL) databases, a NoSQL database, a flat file storage system, or any other suitable data storage system/configuration. In general, the database 180 allows the client computing device 102 and/or the remote computing device 104 to create, retrieve, update, and/or retrieve records relating to performance of the techniques herein. The client computing device 102 may include a set of database drivers for accessing the database 180 of the remote computing device 104. In some embodiments, the database 180 may be located remotely from the remote computing device 104, in which case the remote computing device 104 may access the database 180 via the NIC 144 and the network 106.

The input device 182 may include any suitable device or devices for receiving input, such as one or more microphones, one or more cameras, a hardware keyboard, a hardware mouse, a capacitive touch screen, etc. The input device 182 may allow a user (e.g., a system administrator) to enter commands and/or input into the remote computing device 104, and to view the result of any such commands/input in the output device 184. For example, an employee of the agrilytics company may use the input device 182 to adjust parameters with respect to one or more aspects of the fellowship program.

The output device 184 may include any suitable device for conveying output, such as a hardware speaker, a computer monitor, a touch screen, etc. The remote computing device 104 may be associated with (e.g., leased, owned, and/or operated by) the Fellowship company. As noted above, the remote computing device 104 may be implemented using one or more virtualization and/or cloud computing services.

One or more application programming interfaces (APIs) 190 may be accessible via the remote computing device 104. The API 190 may include one or more Representational State Transfer (REST) APIs, for example, each of which provides access to functionality of the modules in the memory 142. For example, the Fellowship Company may provide access to one or more services provided by the API 190 that correspond to one or more respective groupings of the modules in the memory 142. For example, the Fellowship Company may make available information related to fellows (e.g., an anonymized skill graph) via the API 190. Many uses of the API 190 are envisioned.

In an embodiment, a second API 190 may be provided as a white-labeled service for performing the techniques described herein with respect to data collection, processing and/or visualization. In particular, the third party may provide input data that is processed according to the present techniques. The third party may find use of the present techniques advantageous, especially when assessing the skill strengths of potential candidates.

Exemplary Fellow Skills Graph and Exemplary Curriculum Graph Embodiments

Figure 2A:
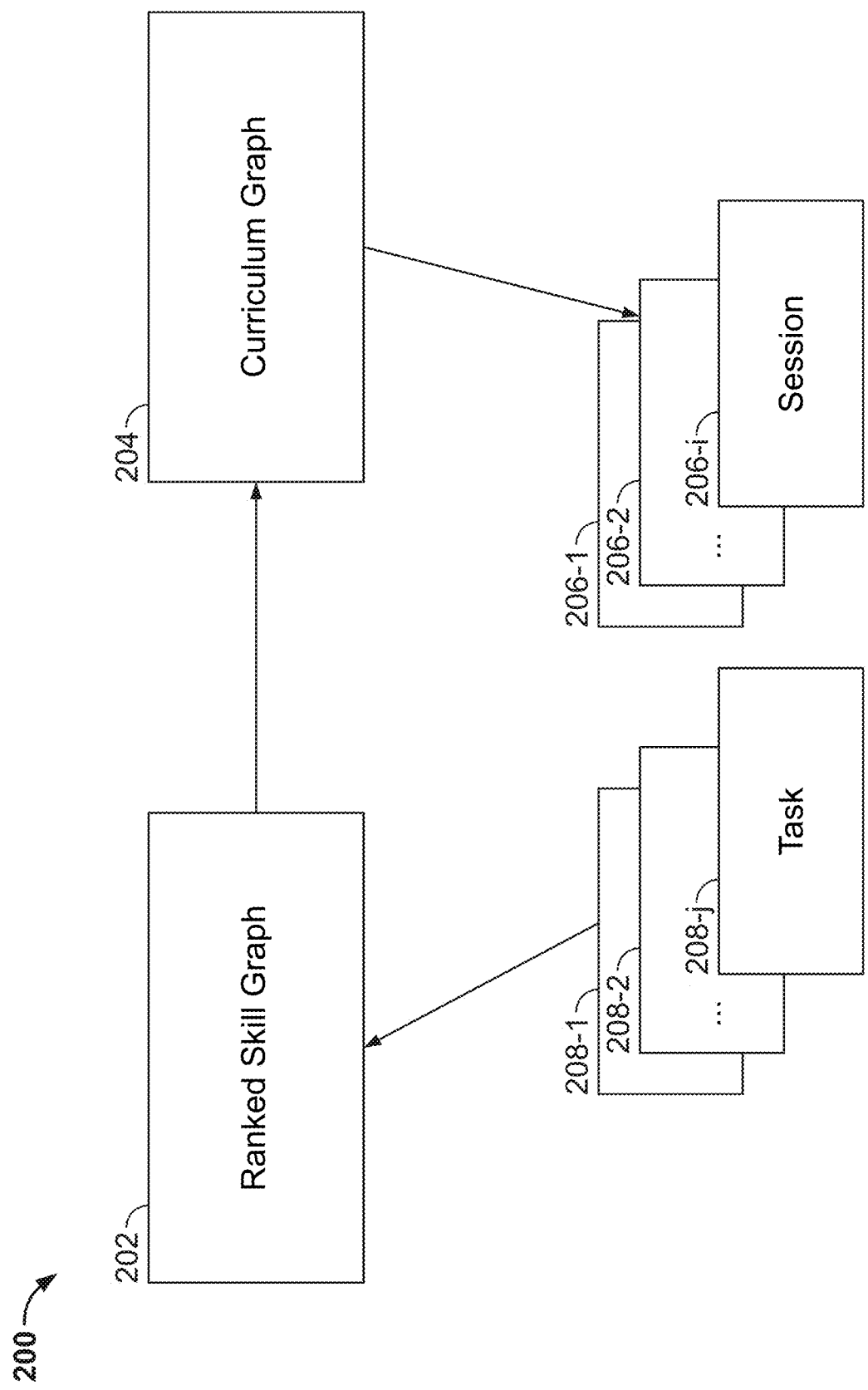
FIG. 2A depicts a block diagram of an exemplary computing environment including a skills graph, a curriculum graph, a plurality of sessions and a plurality of tasks, according to one embodiment.

FIG. 2A depicts a block diagram of an exemplary computing environment 200 including a skills graph 202, a curriculum graph 204, a plurality of sessions 206 and a plurality of tasks 208, according to one embodiment. In general, the skills graph 202 may be a data structure (e.g., a directed acyclic graph) that includes a root node having one or more child nodes. In some embodiments, each of the nodes in the skills graph 202 may include one or more child nodes and/or one or more child leaf nodes. A leaf node is a node that lacks any child nodes. The curriculum graph 204 may be a graph (e.g., a directed acyclic graph) that includes a root node having one or more child nodes. The child nodes in the curriculum graph 204 may be leaf nodes. The present techniques may include techniques for traversing the skills graph 202 and the curriculum graph 204, for example, by accessing parent and child attributes.

Each of the users of the computing environment 100 (e.g., each fellow, each fellowship manager, etc.) may be associated with a respective skills graph 202. The respective skills graph 202 may be stored in the database 180, for example, as discussed above. As discussed, the curriculum module 154 may include instructions for analyzing the skills graph 202 to weight the nodes in the curriculum graph 204. The curriculum module 154 includes instructions for creating tasks and sessions. Specifically, the instructions may analyze the ranked skills in the skills graph 202 to identify a set of ranked skills (e.g., a number of nodes corresponding to the lowest-rated skills of the user corresponding to the skills graph 202).

Based on the identified set of ranked skills, the instructions may select one or more curriculum nodes from the curriculum graph 204, and based on the selected curriculum nodes, generate a scheduling object that includes one or more sessions and/or one or more tasks. The instructions may generate the scheduling object so as to avoid time conflicts of the fellow, and/or the fellow's mentor.

The instructions may include updating the skills graph 202 as the fellow participates in the generated sessions, and performs the generated tasks. For example, when the fellow completes a task belonging to a specific category, the instructions may update the rating of that specific task to indicate whether the fellow was successful or not in completing the task. In this way, the completion is a zero-sum attribute, which enables zero-sum ranking techniques (e.g., Elo ratings) to be used to independently update ratings of the mentor, fellow, etc. The instructions may update each node of the skills graph 202 independently, and determine the fellow's aggregate rating by averaging the respective ratings of all nodes in the skills graph 202. The instructions may also compute one or more sub-ratings (e.g., the user's rating with respect to one or more categories in the skills graph 202).

Figure 2B:
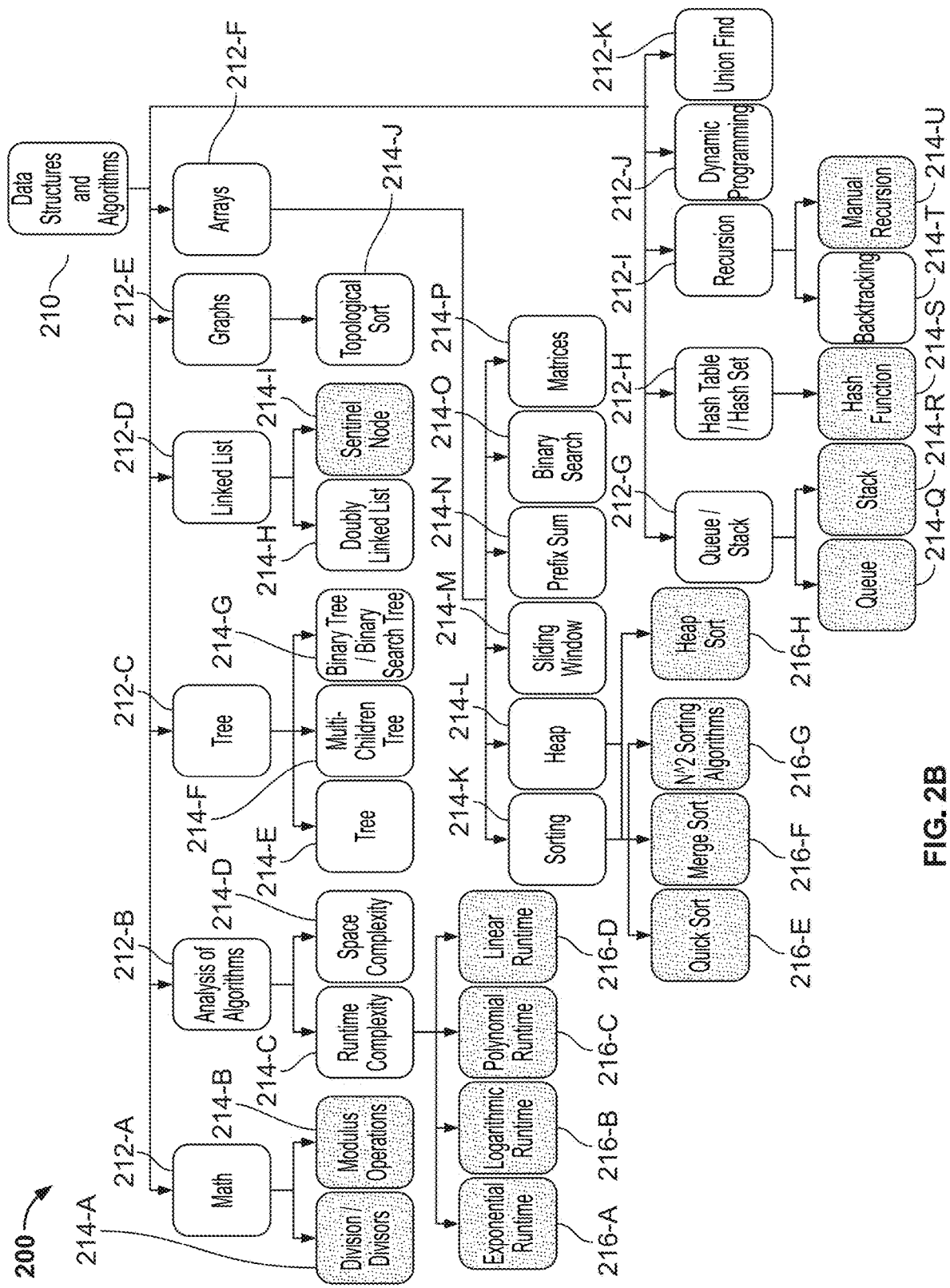
FIG. 2B depicts an exemplary block diagram of the exemplary computing environment of FIG. 2A, further including a fellow skills data structure, according to one embodiment and scenario.

Turning to FIG. 2B, a detailed skills data structure having a root node 210 is depicted. The detailed skills graph may correspond to the skills graph 202 of FIG. 2A, for example. The root node 210 has a plurality of child nodes 212, including a math child node 212-A, an analysis of algorithms child node 212-B, a tree child node 212-C, etc. Each of the child nodes 212 in the beneath the root node 210 correspond to topic areas in computer science. Thus, the skills graph of FIG. 2B may be suitable for a fellow who is learning fundamental computer science. On the other hand, a graphic designer fellow might include some of the same, or different, child nodes 212.

Each of the child nodes 212 includes further topical child nodes 214. For example, the analysis of algorithms child node 212-B has two child nodes, a runtime complexity child node 214-C and a space complexity child node 214-D. Other child nodes 212 (e.g., an arrays child node 212-F) may have one or more additional sub-topic nodes 214. The topic nodes 214 may be leaf nodes, or non-leaf nodes.

The topic child nodes 214 may have still further child nodes 216 that include still further topical subdivisions. For example, the runtime complexity child node 214-C includes four child nodes, an exponential runtime child node 216-A, a logarithmic runtime child node 216-B, a polynomial runtime node 216-C, and a linear runtime node 216-D.

It will be appreciated by those of ordinary skill in the art that the skills graph of FIG. 2B is intentionally simplified for explanatory purposes. The depth of the skills graph may be of any suitable depth. For example, a topic (e.g., "arrays") may include many (e.g., 20 or more) recursive sub-nodes leading to one or more respective leaf nodes. Further, it will be appreciated by those of ordinary skill in the art that expressing the knowledge of a given field (e.g., software engineering, medicine, a trade, etc.) as a topical graph as in FIG. 2B is beneficial for several reasons. First, as noted, the tree data structure lends itself to traversal. Different types of traversal may be performed, such as breadth-first traversal and depth-first traversal. The skills graph may be ranked and sorted using such techniques, for example to arrange the graph according to the fellow's best-performing skills, worst-performing skills, etc.

Furthermore, the present techniques may include instructions for computing a skill rating for each node in the tree, whether that node is a leaf node or not. For example, as discussed above, the rating module 160 of FIG. 1 may compute the fellow's skill rating (e.g., an Elo rating for a stack node 214-R, representing the user's knowledge of the function stack). The instructions may identify that the user's rating is weak, relative to the user's ratings for other skills (e.g., the user may have a stack node 214-R rating of 1100, and a math node 212-A rating of 1800). Thus, the present techniques advantageously enable precise targeting of the user's weaknesses, by generating the most relevant support and challenges (e.g., a session focusing on stack programming, and a series of programming challenges and/or conceptual questions related to solving problems using the stack).

Yet another advantage of the skills graph is that after the fellow has been accessing the system 104 for some time, the skills graph begins to represent the fellow's knowledge of relevant skills. Thus, the present techniques may compare skills graphs, to determine the relative strength of a plurality of fellows. In some embodiments, the present techniques may apply a skills graph overlay, enabling generalizations about relative abilities. For example, a data structures overlay may group all nodes 212 that relate to data structures together. The instructions may compute a respective average for the grouping for a plurality of fellows, and then rank the fellows according to the respective average. In this way, the fellows may be ranked by a basket of skills that relate to a particular topic (e.g., data structures). It should be appreciated that other ways of comparing fellows, and computing statistics about fellows, are envisioned.

The present techniques provide still further advantages, by enabling precise matching of fellows to job functions and business requirements. For example, in some embodiments the present techniques may allow a third party (e.g., a corporate human resources manager) to access a webpage (not depicted). The webpage may include a list of skills relevant to a given position that the third party may select from. The present techniques may include instructions for performing a search of all fellows' respective skills graphs to find fellows whose strengths most closely match the relevant skills. In this case, the skills overlay is dynamically determined by the third party, and used by the present techniques to select the candidate whose skills are the closest to the third party's requirements.

As noted, in some embodiments, the skills graph 202 may be ordered. For example, each of the child nodes in a given fellow's skills graph may be ranked according to a respective ELO rank. The skills graph 202 need not be a static data structure, however. Specifically, the present techniques may include instructions (e.g., in the skills module 152 of FIG. 1) for updating the fellow's respective skills graph ratings in response to events. Events may include the user's completion of a session or task, for example. The result of this updating is a highly sensitive, and fresh model of the fellow's knowledge.

By applying a modified version of a rating system such as Elo, the present techniques enable ratings of fellows' knowledge to be updated in a way that takes into account the difficulty of the task performed by the fellow. Specifically, each node in the curriculum graph 204 may also include a respective rating, that is updated when a fellow successfully completes (or fails to complete) the task. Thus, the fellow's ranking for a particular task is inferred from the difficulty of the tasks. As discussed above, the present techniques enable the aspiring student to identify gaps in knowledge, and to participate in feedback activities that are specifically optimized for each fellow based on areas of improvement. The graphical user interface techniques discussed below are used in some embodiments to effectuate this feedback.

Exemplary Graphical User Interface Embodiments

Figure 3A:
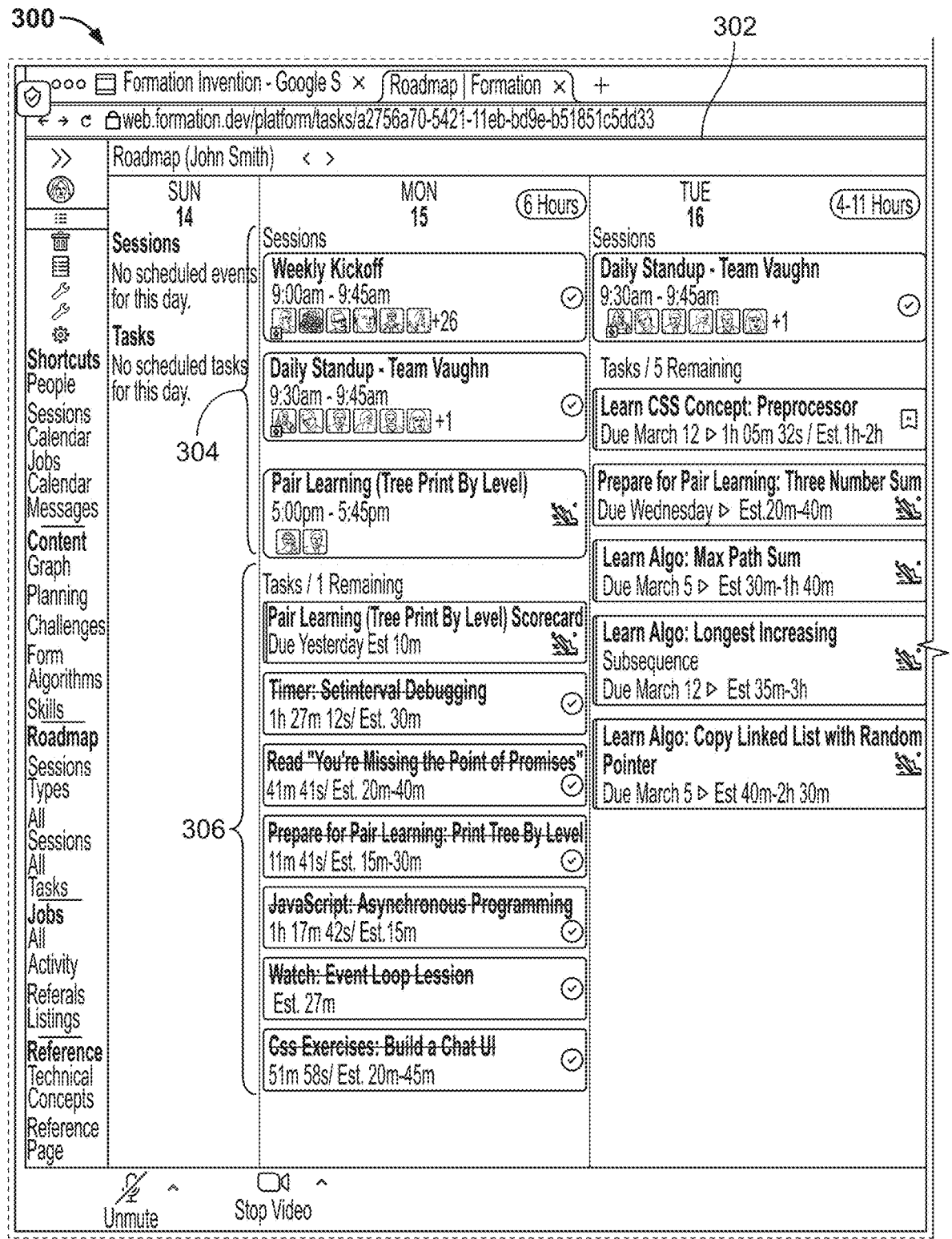
FIG. 3A depicts an exemplary roadmap graphical user interface for presenting session and task information to a user, according to one embodiment.

FIG. 3A depicts an exemplary roadmap graphical user interface (GUI) 300 for presenting session and task information to a user, according to one embodiment. The roadmap GUI 300 includes a calendar window 302 that includes vertical sub-windows each corresponding to a date. The dates are further subdivided into a session panel 304 and a task panel 306. The session panel 304 and the task panel 306 may include session and task instances that correspond, respectively, to one of the plurality of sessions 206 and one of the plurality of sessions 208 of FIG. 2A. For example, FIG. 3A depicts a "Daily Standup" session instance and a "Learn CSS Concept: Preprocessors" task.

The fellow may visit the session instances and task instances to participate in mentor-led activities and to complete homework activities. The fellow's successful participation may be noted by the mentor leading the session instance, leading to the fellow's skills graph being updated. For example, when the fellow successfully participates in a Pair Learning session related the number of ways to make coin change, instructions included in the session module 156 of FIG. 1 may update a "dynamic programming" skill rating of the fellow's skills graph. Of course, completion or failure of a session may lead to a plurality of independent updates. It should be appreciated that a fellow may pass part of a session but fail another. In such cases, two respective skills of the fellow may be updated with, respectively, a rating increase and a rating decrease.

Furthermore, as discussed above, one of the important advantages of the present techniques over conventional approaches is that sessions and tasks are selected for the fellow according to the fellow's current skill levels, in a feedback loop. As such, the roadmap GUI 300 may be updated each time the fellow interacts with a session or task. This may lead to the fellow's roadmap GUI 300 being updated in real time (i.e., as soon as the fellow completes one task).

For example, with reference to FIG. 3A, if the fellow fails the Tree Print by Level task that is part of the tasks panel 306, then the user's skill graph may be updated to reflect a loss in rating in the category of graphs. For example, in the case of task failure, the rating of the node 212-E may be reduced according to the difficulty of the Tree Print by Level task, by retrieving the Tree Print by Level task rating from the curriculum graph. Once the user's skill graph is updated, the present techniques may regenerate the user's optimal path, resulting in a new set of sessions and/or tasks for the same day, and/or the next day of the week. In this way, the fellow is benefited by the next activities always reflecting areas where the greatest improvement can be found. The fellow may select the sessions and/or tasks to view more information, as shown in FIG. 3B.

Figure 3B:
FIG. 3B depicts an exemplary session information detail graphical user interface, according to one embodiment.
Figure 3B:
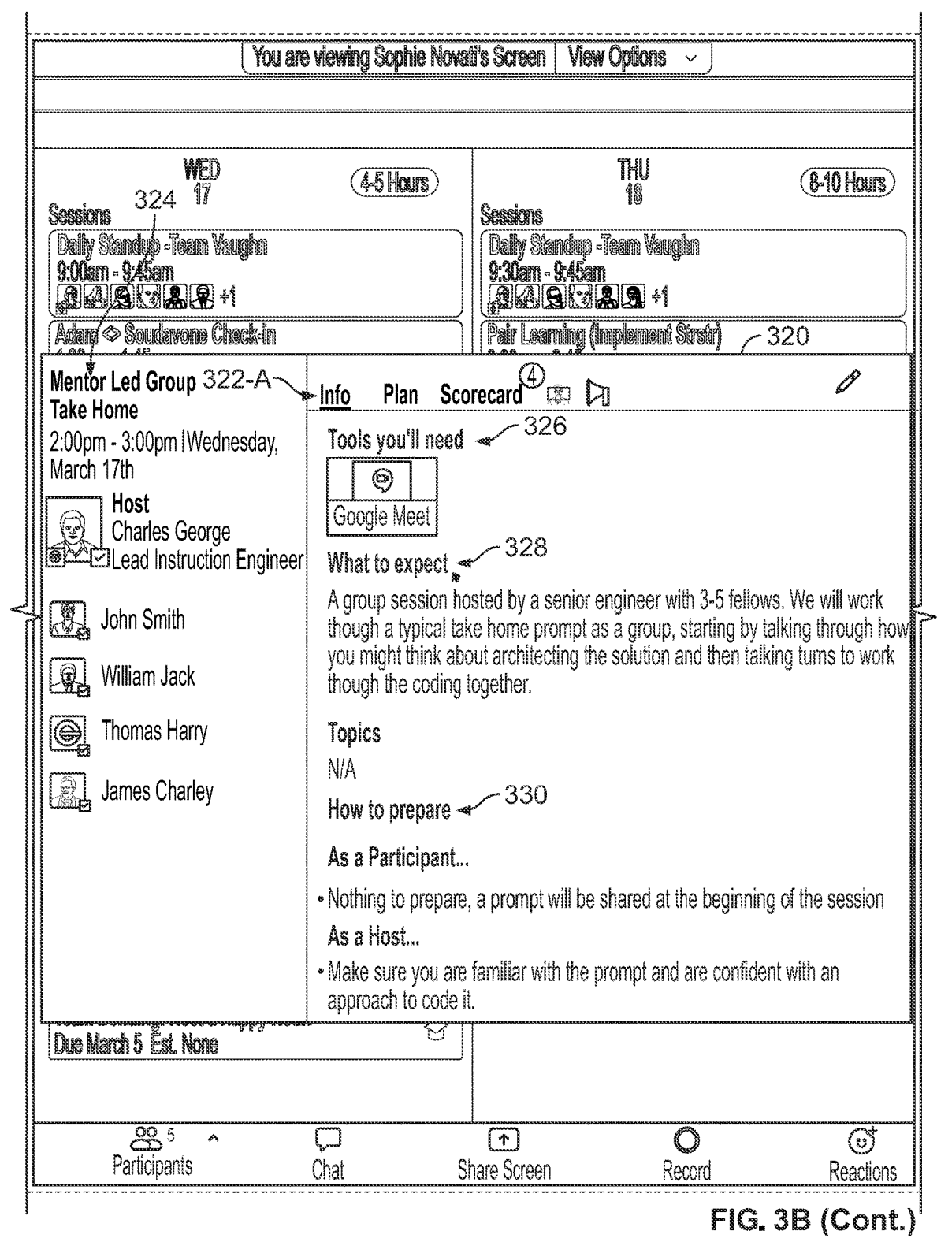
Figure 3B:
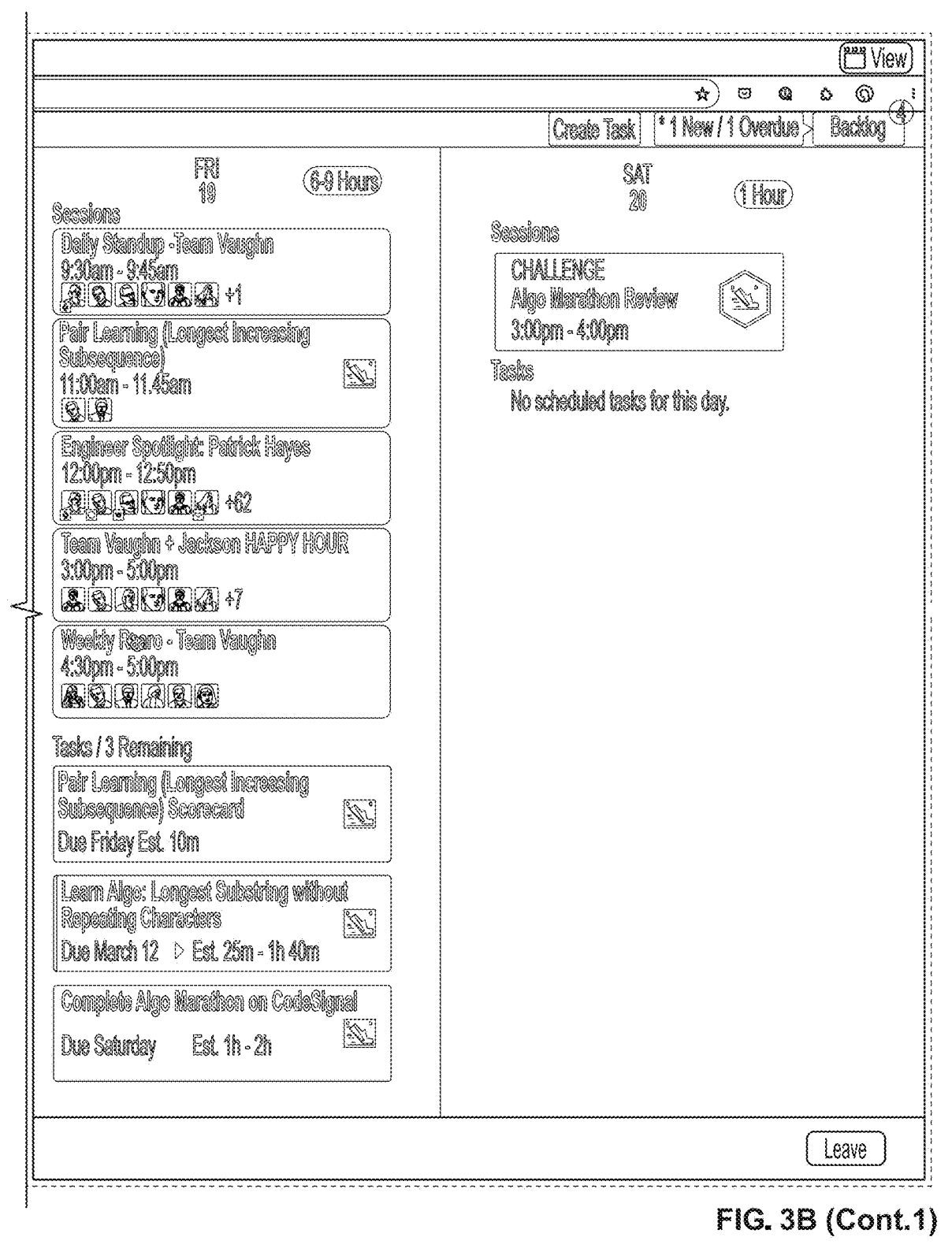

FIG. 3B depicts an exemplary session information graphical user interface 320, according to one embodiment. For example, the session information GUI 320 may be displayed in response to the user clicking on the corresponding session instance on Wednesday March 17th. The session information detail GUI 320 includes a session description panel 324 that includes information about the leader of the session, and co-fellow participants. The session information GUI 320 includes an information tab 322-A that displays a list of tools necessary to complete the session 326, a description of the session 328 and a list of preparatory actions 330. The session information may be retrieved by the session module 156 from the database 180 of FIG. 1, in some embodiments.

Figure 3C:
FIG. 3C depicts an exemplary session plan detail graphical user interface, according to one embodiment.
Figure 3C:
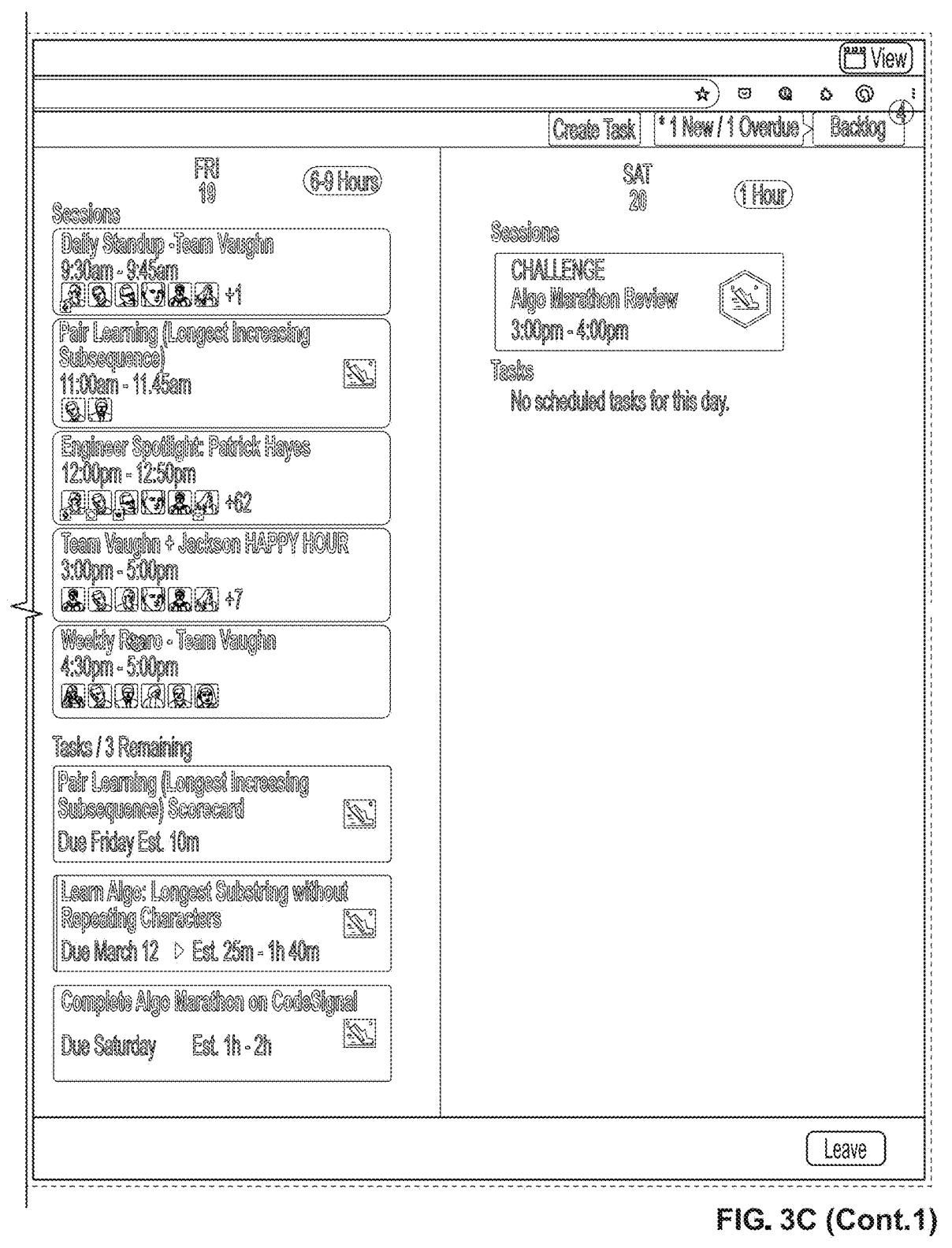
Figure 3D:
FIG. 3D depicts an exemplary session scorecard detail graphical user interface, according to one embodiment.
Figure 3D:
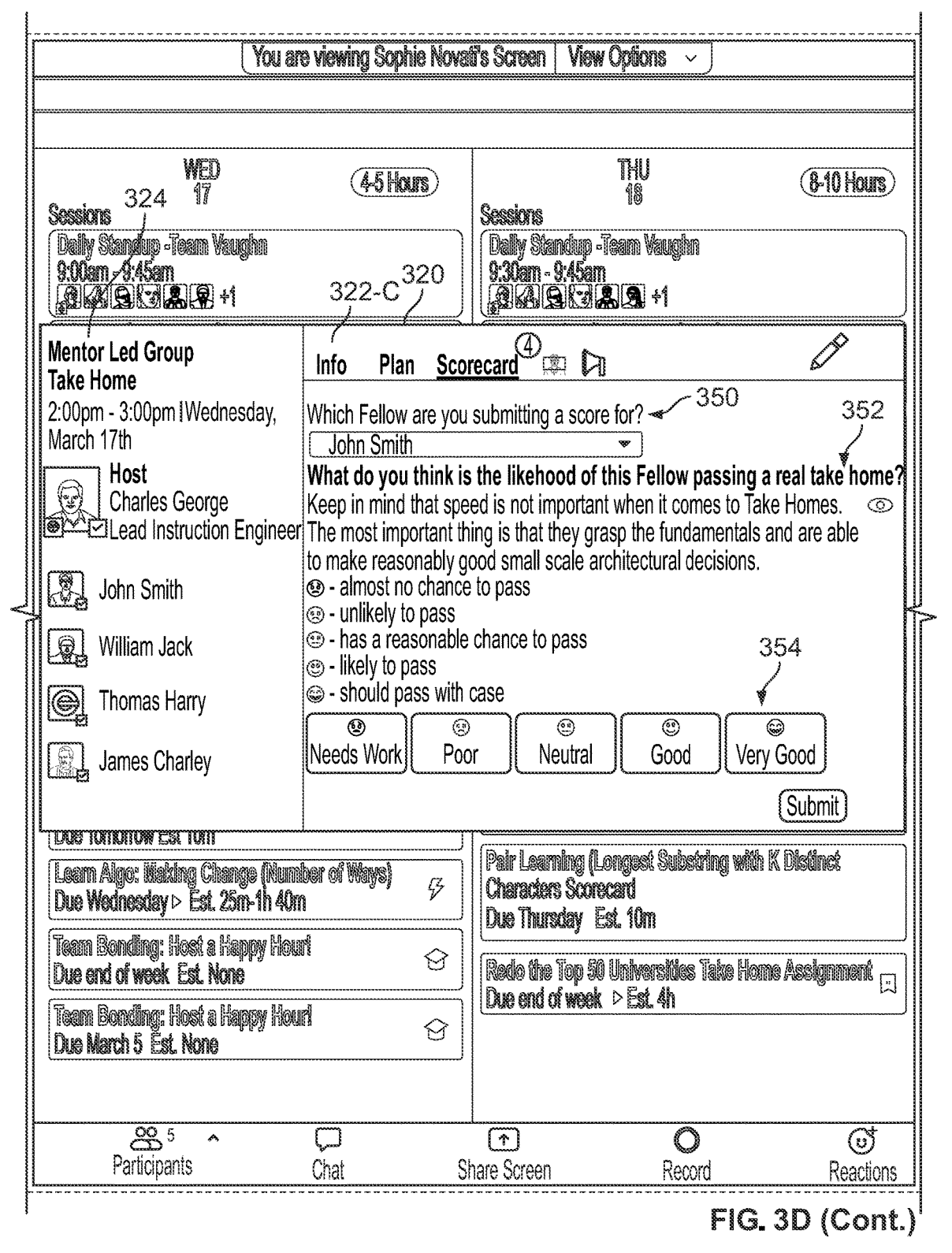
Figure 3D:
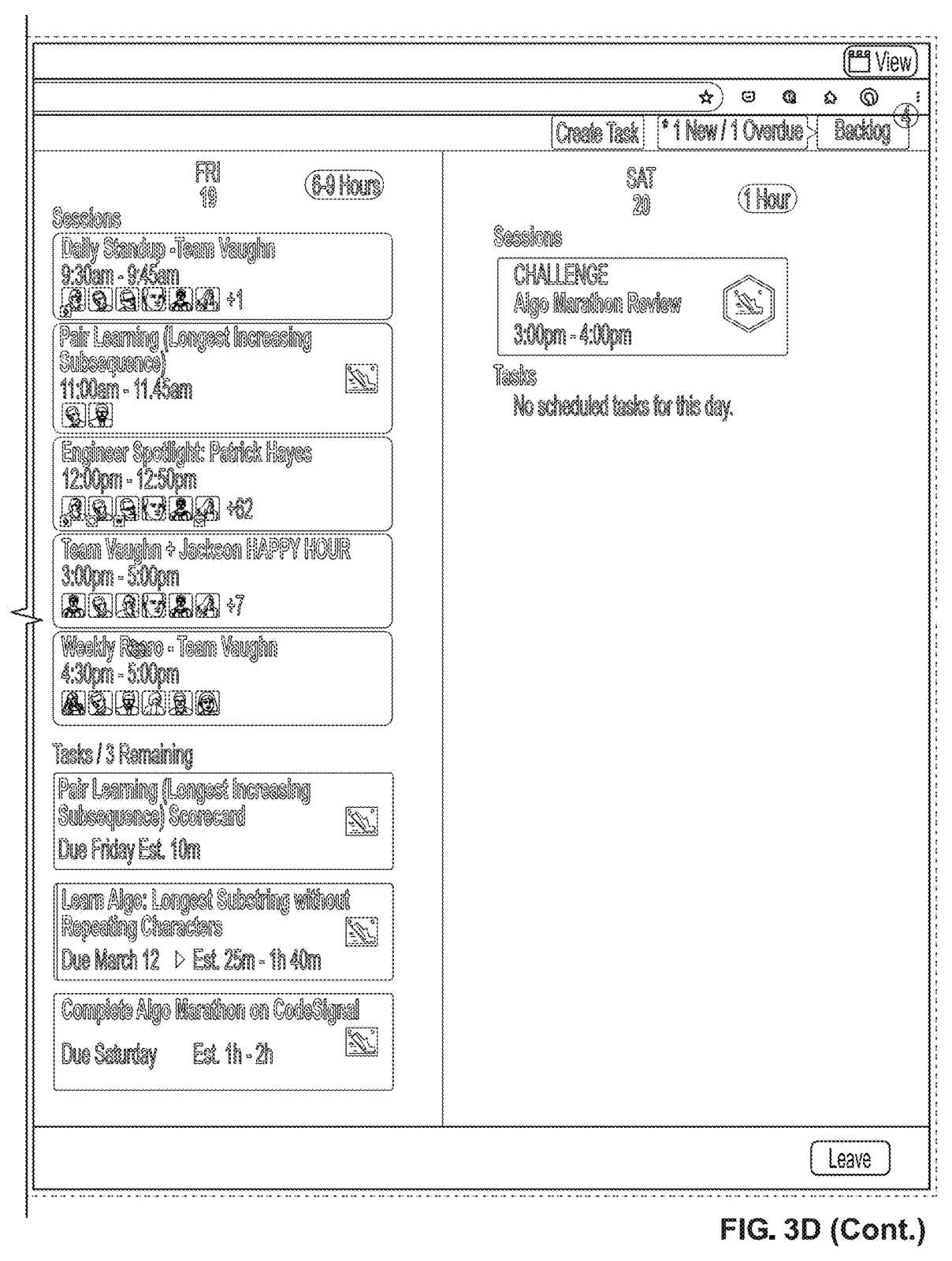

As shown in FIG. 3C, the fellow may select a session plan tab 322-B to view session plan information, including a session purpose description 340, a session question prompt 342, a discussion description 344, a pair programming description 346, and an extra credit prompt 348. Of course, the session information GUI 300 is for exemplary purposes only. In some embodiments, the information displayed in the session plan tab 322-B may differ, and may include more/less information, to facilitate the needs of a particular session. The fellow (or mentor) may select a session scorecard tab 322-C, as depicted in FIG. 3D. In some embodiments, only the mentor may select the session scorecard tab 322-D. The session scorecard tab 322-D enables the mentor to select a fellow to rate via a fellow selection element 350, includes a fellow rating description 352, and a rating selection element 354. By interacting with the session scorecard tab 322-D, the mentor may rate the performance of each fellow-mentee, resulting in updates to the fellow's skills graph, with respect to the particular skill(s) associated with the session that is the topic of the session information GUI 320.

Figure 3E:
FIG. 3E depicts an exemplary simplified roadmap graphical user interface for presenting task and session information to a user, according to an embodiment.

FIG. 3E depicts an exemplary simplified roadmap graphical user interface 360 for presenting task and session information to a user, according to an embodiment. A set of computer-executable instructions may cause the GUI 360 to be displayed in an output device of a computing device (e.g., the client computing device 102, the remote computing device 104, etc.). For example, the instructions may be stored in the memory 112 of the client computing device 102, or in the memory 142 of the remote computing device 104. For example, the GUI 360 includes a window 362 that may be displayed in the output device 124 of the client computing device 102, specifically, in a window of an operating system's window manager/compositor.

The above-described examples, including the skills graph 202 and FIGS. 3A-3D depict GUIs in a high level of detail. However, it will be appreciated by those of ordinary skill in the art that in some embodiments, a simplified GUI (e.g., the GUI 360) may be displayed. The GUI 360 includes a session pane 364 and a tasks pane 366 for each day of the week in a calendar view. In some embodiments, the calendar view may depict more, or fewer days of the week. In still further embodiments, the calendar view may depict a single day at a more granular level (e.g., an intra-day hourly calendar). The hourly calendar view may depict sessions and/or tasks with respect to overlapping and/or adjacent blocks of time.

While the FIGS. 3A-3E depict tasks and sessions related to software engineering, it should be appreciated by those of ordinary skill in the art that any course of study may be represented using the GUIs depicted therein, including any field that includes personal, educational, and/or career goals of any kind (e.g., academic studies, certifications, trade school programs, mentorship programs, driver's education, etc.). In other words, the present techniques are not limited to any particular field of study, academic program/institution, or course type. Rather, the present techniques are applicable to any endeavor the knowledge of which can be represented hierarchically (or otherwise) using a skills graph and/or a curriculum graph, irrespective of whether that knowledge is conventionally delivered via classroom learning, on-the-job training, virtual classroom, etc. and irrespective of whether the student is enrolled in a formal educational program or not.

Figure 4A:
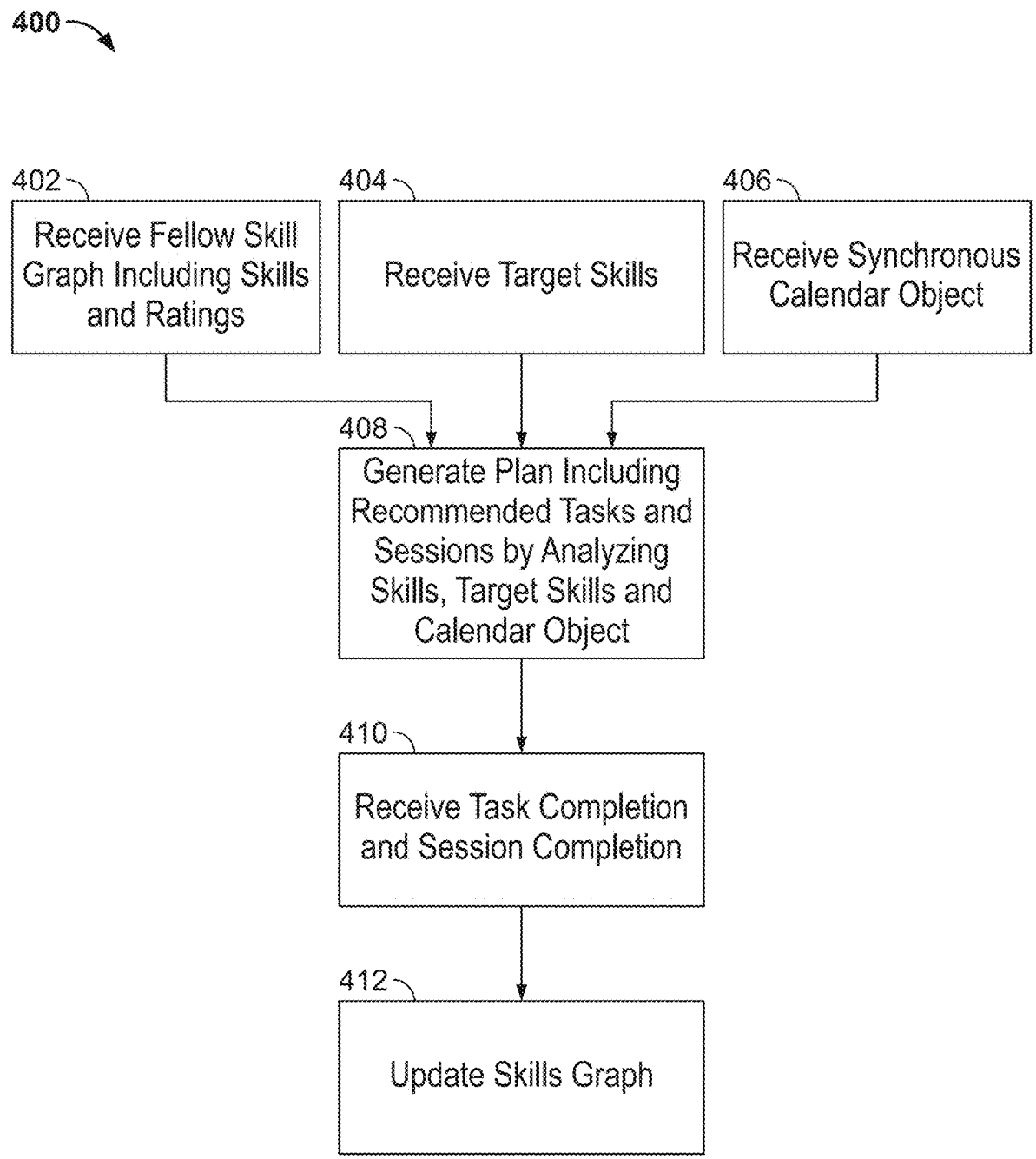
FIG. 4A depicts a flow diagram of an exemplary method of generating a fellow plan, according to one embodiment.

Exemplary Computer-Implemented Methods for Generating Plans and Updating the Fellow Skill Graph FIG. 4A depicts a flow diagram of an exemplary method 400 for generating a fellow plan, according to an embodiment. Herein, a "plan" may also be referred to as a path. The method 400 may include receiving a fellow skill graph, including one or more skills (block 402). The skill graph may correspond to the fellow. As noted above, each fellow may be associated with one or more skill graph (e.g., the skills graph 202 of FIG. 2A). Each of the one or more skills may include one or more respective ratings. For example, the received fellow skill graph may correspond to the ranked skill graph 202 of FIG. 2A, and/or the fellow skill graph having the root node 210 depicted in FIG. 2B. The method 400 may include receiving a set of one or more target skills (block 404). In some embodiments, the target skills may be expressed in a graph data structure, such as the curriculum graph 204 of FIG. 2A. As discussed above, the received skills graph and/or received target skills may a partial subset of the skills included in the curriculum graph. For example, the target skills may be include skills from a skills overlay selected by a third party. The method 400 may further include receiving a calendar object (block 406). The calendar object may a synchronous object, in some embodiments. For example, the calendar may be stored in a suitable electronic format, such as a Java Calendar object, an iCal file, a python calendar object, etc.

The method 400 may include generating a dynamic education plan including one or more recommended tasks and/or one or more recommended sessions, by analyzing the received fellow skill graph, the received target skills, and the synchronous calendar object (block 408). The dynamic education plan may include one or more recommended task and/or one or more recommended session. The one or more recommended task and the one or more recommended session may be assigned to a time slot in reference to the synchronous calendar object. The generation of the dynamic education plan may proceed in stages as discussed above. For example, in some embodiments, the generation may include the application of machine learning. In some embodiments, one or more of the skills graph, the target skills and the synchronous calendar object may be fed into a trained machine learning model (e.g., an artificial neural network), wherein the trained machine learning model is trained to predict a set of one or more tasks and/or one or more sessions for the fellow. Such a trained machine learning model may be an unsupervised machine learning model, for example one that clusters skills according to rating. In some embodiments, the trained machine learning model may be trained using historical data (e.g., historical ratings of other fellows). The scheduling step may be performed as a separate stage, either before or after the machine-learning based task and/or session generation analysis, in some embodiments.

The method 400 may include receiving task completion information and/or session completion information (block 410). The task completion and/or session completion information may be received from one or more client devices (e.g., respectively, from a first client computing device 102 of FIG. 1 operated by the fellow, and from a second client computing device 102 of FIG. 1 operated by the mentor).

Task completion information may be generated by the user's access of tasks, for example via the tasks panel 306 of FIG. 3A. The task module 158 may transmit the task completion information by, for example, inserting a row into the database 180 in response to the fellow's completion of a task. Session completion information may be generated, for example, when the mentor selects the rating selection element 354 of FIG. 3D. The task completion information and session completion may include, respectively, one or more indications of completion. For example, the task completion information may include one or more indications of task completion, wherein each indication refers to whether the fellow completed the task successfully or not (e.g., for a pass-fail task, a task represented as a real number from 0 to 1, etc.). The session completion information may include one or more indications of session completion, wherein each indication refers to the fellow's performance with respect to the session. For example, the session completion information may correspond to the rating selection chosen by the mentor from the rating selection element 354.

The method 400 may include analyzing the task completion information and/or session completion information, and updating the skill graph of the fellow (block 412). For example, the received task and session may each include one or more identifiers, which may be used to query information about the task. In some embodiments, the method 400 may include performing an SQL join operation to identify a set of skills from the database 180 that match the task completion information. In this way, the method 400 may determine which skills in the fellow's skill graph should be updated to correspond to the task completion and/or session completion information. For example, when the task completion information indicates that the user performed a particular task A, the method 400 may query the database 180 to determine which skills are implicated by the task A. The method 400 may then update the rating of those skills to reflect whether the user passed or failed the task, or where the user's performance fell on a scale from 0 to 1. Sessions may be similarly queried and updated. Further details regarding session and task planning are discussed below.

Figure 4B:
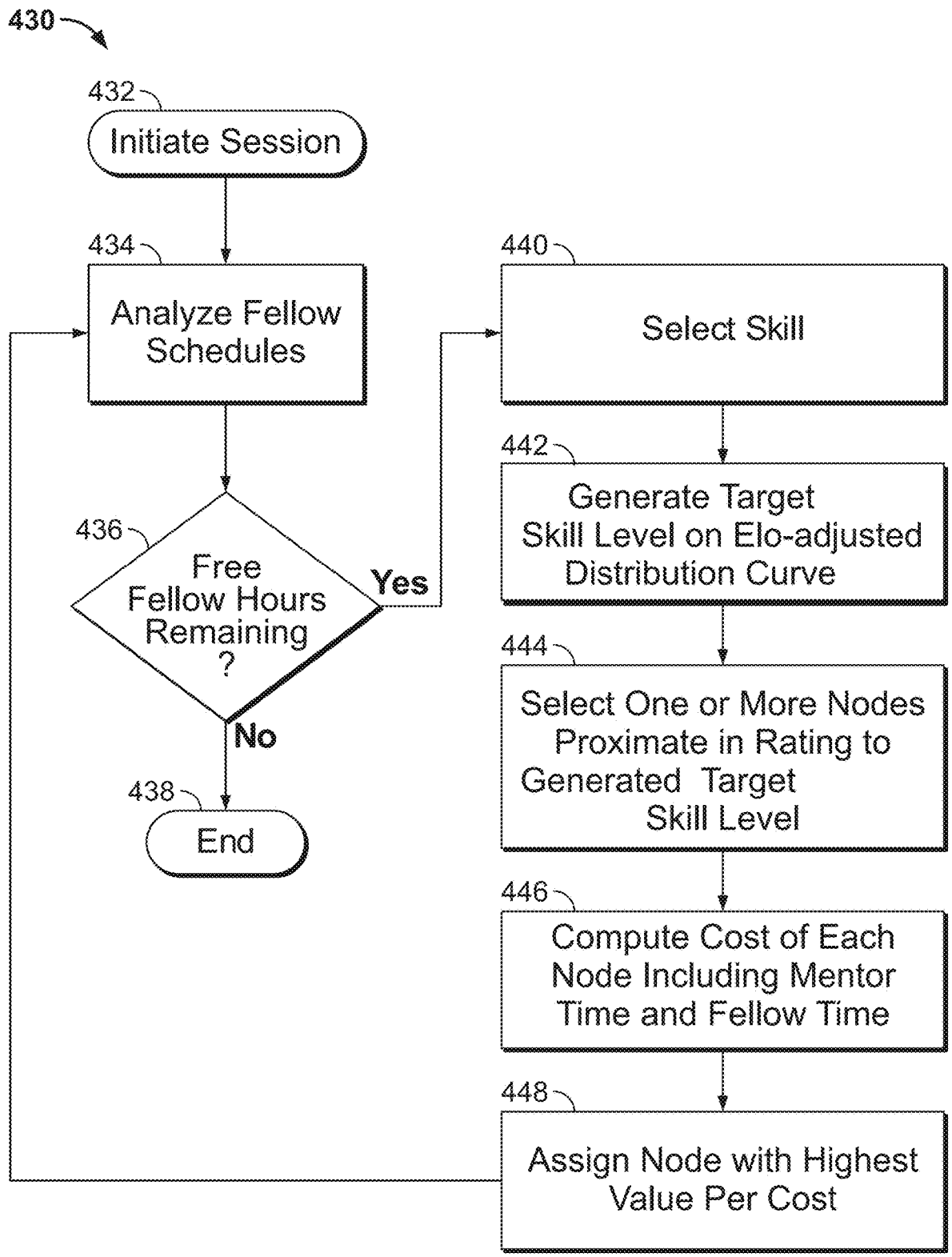
FIG. 4B depicts a flow diagram of an exemplary method for generating an optimal fellow plan, according to one embodiment.

Turning to FIG. 4B, a flow diagram of an exemplary method 430 for generating an optimal fellow plan is depicted, according to an embodiment. In some embodiments, the method 430 may correspond to the block 408 of the method 400. In some embodiments, the method 430 may be performed independently (e.g., by the session module 156 of FIG. 1 and/or the task module 158 of FIG. 1).

The method 430 may include initiating a session (block 432). Initiating the session may include the session module 156 of FIG. 1, for example, generating a session object. The session object may include properties of the session, such as those displayed in FIG. 3A, including but not limited to: a session name, a session duration, a session mentor, and a list of one or more foreign keys relating to fellow-mentees assigned to the session. The session may include additional/other information, such as one or more foreign keys to skills implicated by the session.

The method 430 may include analyzing the schedules of the one or more fellows currently assigned to the session (block 434). Each of the fellows may have a set of target skills, each of which has a respective rating. The method 430 may include analyzing each fellow's calendar to determine whether the fellow has available time remaining (block 436). In some embodiments, determining available time remaining may include searching for unoccupied blocks of a given minimum length (e.g., 30 minutes) within certain time constraints (e.g., from 9 am-5 pm, Eastern time). When the method 430 determines that there are no free hours remaining, the method may terminate (block 438). When the method 430 determines that there are free blocks remaining, the method may include selecting one skill (block 440). The skill may be selected according to a number of strategies.

For example, the skill may be selected at random, according to the fellow's lowest rated skill, according to the fellow's highest rated skill, within a range of ratings (e.g., top quartile, bottom quartile, etc.). In some embodiments, the skill may be selected according to a third party preference or selection. In this way, a third party may direct the user's skill development, leading to a greater likelihood that the user will attain minimum skill levels to be considered for employment by the third party. In still further embodiments, the method 430 may select the skill thematically. For example, the purveyor of the present techniques may designate a theme (e.g., recursion week). During that period of time, the skill selection may proceed according to the designated theme. It should be appreciated that many methods for selecting the skill are envisioned.

The method 430 may include generating a target skill level (block 442). For example, the target skill level may be based on an distribution curve (e.g., an adjusted random distribution curve). In some embodiments, the method 430 may select a target skill level on an Elo-adjusted random distribution curve. The target skill level may be randomly generated, in some embodiments. In still further embodiments, the target skill level may be chosen according to other criteria. For example, the target skill may be chosen according to the fellow's historical performance in tasks of a particular category and/or any of the strategies used for selecting the skill at block 440. The target skill level may be expressed in terms of a rating that is comparable to the respective ratings of the skills in the skills graph of the fellow, and the curriculum graph. In some embodiments, the method 430 may include generating a target skill level, or Elo. Specifically, the rating module 160 of FIG. 1 may include computer-executable instructions that, when executed, cause one or more skills to be selected from the skills graph according to a user-selected Elo value (e.g., a value received via the client computing device 102). In some embodiments, the instructions may cause the one or more skills to be selected from the skills graph according to a pre-determined value (e.g., a value stored in the memory of the remote computing device 104).

The method 430 may include selecting one or more nodes from the curriculum graph that are proximate in rating to the generated target skill level (block 444). For example, the generated skill level may correspond to an Elo rating of 1150. The method 430 may include selecting a set of skills from the curriculum graph that have respective ratings of 1147, 1149, 1156, and 1160. The number of skills to select may be predetermined, such that a maximum number of skill is always selected.

The method 430 may include computing the cost of each selected node, including the predicted mentor time commitment, predicted fellow time commitment, etc. Other costs that may be included are technology costs (e.g., cloud computing resource costs necessary to facilitate the node), travel costs, etc.

The method 430 may include assigning the node with the highest value per cost to the fellow (block 448). Once the node is assigned to the fellow, the node may appear in the calendar window 302 of FIG. 3A, for example, as a task or a session to be completed.

Once the node is assigned to the fellow, the fellow may proceed to join the session or complete the task, etc, at which point the fellow's skill are updated, as discussed below. Finally, control flow may return the block 434, whereupon the method repeats, selecting an additional skill for the user to complete within an available hourly block. In some embodiments, the method 430 may be executed multiple times for planning purposes, to build the calendar of the fellow, before the calendar window 302 displays the hourly blocks. In other embodiments, a predetermined maximum number of contemporaneous skills may be set, to avoid causing the fellow to feel overwhelmed with work.

Figure 4C:
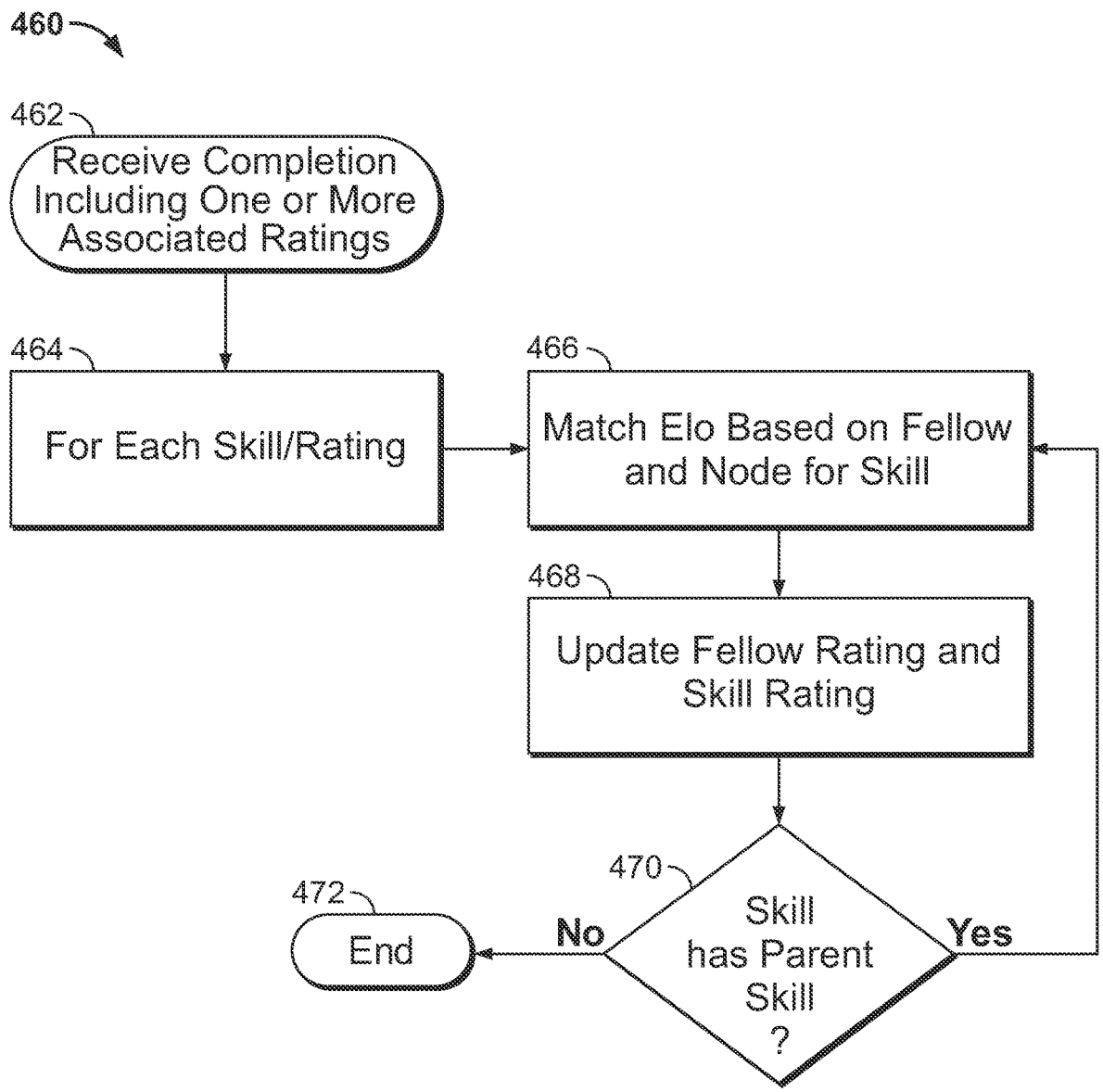
FIG. 4C depicts a flow diagram of an exemplary method for updating a fellow skill graph, according to one embodiment.

Turning to FIG. 4C, a flow diagram of an exemplary method 460 for updating a fellow skill graph in response to a task or session completion is depicted, according to an embodiment. In some embodiments, the method 460 may correspond to the block 412 of the method 400. In some embodiments, the method 460 may be performed independently (e.g., by the rating module 160 of FIG. 1).

The method 460 may include receiving an indication of task completion and/or an indication of a session completion (block 462). The indications of completion may include a respective set of skills, each associated with a respective rating. Each skill and respective rating may represent a skill attempted by the fellow, and a rating difficulty of that skill.

The method 460 may include, for each attempted skill and respective rating (block 464), updating the corresponding skill rating of one or more nodes in the fellow's skills graph (block 468). For example, when the skill corresponds to the heap sort skill node 216-H of FIG. 2B, the method 460 may determine a match between the attempted skill and the node 216-H (block 466). The method 460 may include updating the aggregate skill rating of the fellow and/or the node 216-H using the indication of the attempted skill. For example, when the fellow succeeded in the task/session, the method 460 may update the rating of the node 216-H by incrementing the fellow's rating (e.g., using the Elo rating system). Conversely, when the fellow failed in the task/session, the method 460 may update the rating by decrementing the fellow's rating.

Furthermore, the method 460 may include propagating the updated rating to parent nodes. Continuing the example with respect to FIG. 2B, after incrementing/decrementing the rating of the heap sort node 216-H node in the fellow's skills graph, the method 460 may traverse the graph to the parent of the node 216-H (i.e., the heap node 214-L) (block 470) and update the rating of that node as well (block 468). The method may end when the node has no parent node (block 472). In some embodiments, the method 460 may recurse further along descendants of the skills graph (e.g., to the arrays skill node 212-F). In some cases, the update to parent nodes may be diluted, to accurately reflect the fellow's skill update. For example, the fellow may lose eight Elo points for failing a heap sort task. However, when recursing to the heap topic 214L, only 6 points may be deducted from the user's rating. The method 460 may include instructions for removing successively further points from the respective nodes as distance from the selected node increases. These instructions may be based on a predetermined decay value. Of course, the same decay may apply to correct answers as well, when incrementing fellow ratings during tree traversal.

In some cases, the parent node skills may decrease exponentially on each node traversal. In some embodiments the impact on the skill may be multiplied based on the task type. In embodiments that use an Elo algorithm for performing rating adjustment, a k value (e.g., 32) may be used. Delta for the fellow's skill rating may be computed by multiplying the k value by the difference between the fellow's actual and expected performance, where expected performance is computed by computing a value between 0 and 1 representing the expectation that the user will perform poorly (0.0) or perfectly (1.0). Specifically, the Elo performance formula may be represented as $1/(1+Math.pow(10, ((x-y)/400)))$ wherein x is the fellow's Elo rating for the skill, and y is the Elo rating to of the problem (e.g., task or session). The parameter 400 may refer to an initial rating difference, and may vary depending on the particular embodiment and scenario. The k value may also be modified, in some embodiments, for example to counter rating deflation.

As noted, the present techniques may use a modified Elo algorithm for updating the user's rating when traversing the skills graph. Specifically, each edge in the skills graph may include a relevance cost. For example a relevance cost of 1.0 may indicate no decay/diminishing impact in rating from the current node to the parent node. A relevance value of 0.5 may indicate that the rating of the parent skill is impacted only by half. A relevance value of 0.0 may indicate that the relevance of failing (or succeeding) in the task has no impact on the parent skill rating.

It should be appreciated by those of ordinary skill in the art that assigning relevance to nodes in the skills graph advantageously enables the present techniques to only update the rating of related (i.e., ancestor) nodes when that update is appropriate, such as when the failure or success in relation to a skill node implicates parent/grandparent skills. The relevance value may be a hard-coded global that decreases by half with each traversal, in some embodiments. As noted, in other cases, relevance may be established on a per-edge basis. Still further, in some embodiments, relevance is a default global value, unless a node includes a predefined relevance value.

Finally, the present techniques also modify the Elo rating system by including a factor multiplier (by default 1.0). The factor multiplier may be set in some cases to a value greater than 1.0, for example in sessions that include a mentor, for sessions that last for a longer period of time, etc. In this way, the resultant updates to the fellow's skills are appropriately impactful. Specifically, the change in the user's rating may multiplied by the factor multiplier before the node is updated. Of course, the factorized rating delta may also be subject to the rating decay mentioned above.

It should be appreciated the foregoing discussion is intentionally simplified, and omits details that are relevant to some embodiments. For example, additional complexities not captured in this discussion include calculation of actual performance from feedback forms or other sources. Another nuance includes that each a task completion received at block 410 and/or block 462 would typically involve multiple targeted skills. Thus, the above-described rating update algorithm may be performed multiple times per task. Similarly, a more nuanced algorithm may be used to update the fellow rating in response to non-binary feedback from mentor provided via the session scorecard tab 322-C. Many ways of evaluating the mentor's feedback, and updating the rating of the user may be used, including for example performing sentiment analysis on textual feedback, and updating the user rating based on the outcome of such analysis.

ADDITIONAL CONSIDERATIONS

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

It should also be understood that, unless a term is expressly defined in this patent using the sentence "As used herein, the term" "is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of ordinary skill in the art will appreciate still additional alternative structural and functional designs for implementing the concepts disclosed herein, through the principles disclosed herein. Thus, while particular embodiments and applications have been illustrated and described, it is to be understood that the disclosed embodiments are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

What is claimed:

1. A computing system for improving session and task selection by generating a dynamic path for a fellow, comprising:

one or more processors; and one or more memories storing instructions that, when executed by the one or more processors, cause the computing system to:

receive a skill graph (i) corresponding to the fellow and (ii) having a tree structure capable of being traversed, the skill graph including a root node and a plurality of topical child nodes;

receive at least one of a set of one or more target skills and a synchronous calendar object;

generate the dynamic path including one or both of (i) at least one task, and (ii) at least one session, by analyzing the skill graph, and at least one of (a) the target skills and (b) the synchronous calendar object, using a machine learning model trained using successive evaluation of training samples to predict the one or both of the at least one task and the at least one session, the successive evaluation including creating weights of the machine learning model and adjusting the weights, and the training samples including historical data;

select, when the synchronous calendar object includes at least one free block of time, at least one skill;

generate a target skill level;

select one or more nodes from a curriculum graph proximate in rating to the generated target skill level;

compute a cost of the one or more selected nodes; and assign the node with the highest value per cost to the synchronous calendar object.

2. The computing system of claim 1, wherein the one or more memories store further instructions that, when executed by the one or more processors, cause the computing system to:

display, via the one or more processors, the dynamic path in a graphical user interface of a client computing device.

3. The computing system of claim 1, wherein the one or more memories store further instructions that, when executed by the one or more processors, cause the computing system to:

receive, via a client computing device, one or both of (i) task completion information; and (ii) session completion information; and update at least one skill node in the skill graph corresponding to the fellow by analyzing the one or both of (i) the task completion information, and (ii) the session completion information.

4. The computing system of claim 3, wherein the one or more memories store further instructions that, when executed by the one or more processors, cause the computing system to:

determine a match between an attempted skill and at least one node in the skill graph corresponding to the fellow; and update a rating of the at least one node in the skill graph according to the fellow's success or failure regarding the attempted skill.

5. The computing system of claim 3, wherein the update is performed using a modified Elo rating system, and wherein the one or more memories store further instructions that, when executed by the one or more processors, cause the computing system to:

propagate a respective update to one or more parent nodes of the at least one skill node.

6. The computing system of claim 5, wherein the one or more memories store further instructions that, when executed by the one or more processors, cause the computing system to:

propagate the respective update according to a respective decaying relevance value established by a predetermined global value or a respective per-edge value.

7. The computing system of claim 5, wherein the one or more memories store further instructions that, when executed by the one or more processors, cause the computing system to:

propagate the respective update according to a factor multiplier.

8. A computer-implemented method for generating a dynamic path for a fellow, the method comprising:

receiving a skill graph (i) corresponding to the fellow and (ii) having a tree structure capable of being traversed, the skill graph including a root node and a plurality of topical child nodes;

receiving at least one of a set of one or more target skills and a synchronous calendar object;

generating the dynamic path including one or both of (i) at least one task, and (ii) at least one session, by analyzing the skill graph, and at least one of (a) the target skills and (b) the synchronous calendar object, using a machine learning model trained using successive evaluation of training samples to predict the one or both of the at least one task and the at least one session, the successive evaluation including creating weights of the machine learning model and adjusting the weights, and the training samples including historical data;

selecting, when the synchronous calendar object includes at least one free block of time, at least one skill;

generating a target skill level;

selecting one or more nodes from a curriculum graph proximate in rating to the generated target skill level;

computing a cost of the one or more selected nodes; and assigning the node with the highest value per cost to the synchronous calendar object.

9. The computer-implemented method of claim 8, further comprising:

displaying, via one or more processors, the dynamic path in a graphical user interface of a client computing device.

10. The computer-implemented method of claim 8, further comprising:

receiving, via a client computing device, one or both of (i) task completion information; and (ii) session completion information; and updating at least one skill node in the skill graph corresponding to the fellow by analyzing the one or both of (i) the task completion information, and (ii) the session completion information.

11. The computer-implemented method of claim 10, further comprising:

determining a match between an attempted skill and at least one node in the skill graph corresponding to the fellow; and wherein updating the at least one skill node in the skill graph includes updating a rating of the at least one node in the skill graph according to the fellow's success or failure regarding the attempted skill.

12. The computer-implemented method of claim 10, wherein the updating is performed using a modified Elo rating system; and wherein the updating includes propagating a respective update to one or more parent nodes of the at least one skill node.

13. The computer-implemented method of claim 12, wherein the propagating includes updating each of the parent nodes according to a respective decaying relevance value established by a predetermined global value or a respective per-edge value.

14. The computer-implemented method of claim 12, wherein the propagating includes updating each of the parent nodes according to a respective factor multiplier.

15. A non-transitory computer readable medium containing program instructions that when executed, cause a computer to:

receive a skill graph (i) corresponding to a fellow and (ii) having a tree structure capable of being traversed, the skill graph including a root node and a plurality of topical child nodes;

receive at least one of a set of one or more target skills and a synchronous calendar object;

generate a dynamic path including one or both of (i) at least one task, and (ii) at least one session, by analyzing the skill graph, and at least one of (a) the target skills and (b) the synchronous calendar object, using a machine learning model trained using successive evaluation of training samples to predict the one or both of the at least one task and the at least one session, the successive evaluation including creating weights of the machine learning model and adjusting the weights, and the training samples including historical data;

select, when the synchronous calendar object includes at least one free block of time, at least one skill;

generate a target skill level;

select one or more nodes from a curriculum graph proximate in rating to the generated target skill level;

compute a cost of the one or more selected nodes; and assign the node with the highest value per cost to the synchronous calendar object.

16. The non-transitory computer readable medium of claim 15, containing further program instructions that when executed, cause a computer to:

display, via the one or more processors, the dynamic path in a graphical user interface of a client computing device.

17. The non-transitory computer readable medium of claim 15, containing further program instructions that when executed, cause a computer to:

receive, via a client computing device, one or both of (i) task completion information; and (ii) session completion information; and update at least one skill node in the skill graph corresponding to the fellow by analyzing the one or both of (i) the task completion information, and (ii) the session completion information.

18. A computing system for generating a dynamic path for a fellow, comprising:

one or more processors; and one or more memories storing instructions that, when executed by the one or more processors, cause the computing system to:

receive a skill graph corresponding to the fellow, the skill graph having a tree structure capable of being traversed;

receive a set of one or more target skills;

receive a synchronous calendar object;

generate the dynamic path including one or both of (i) at least one task, and (ii) at least one session, using a machine learning model trained using successive evaluation of training samples, the successive evaluation including creating weights of the machine learning model and adjusting the weights, and the training samples including historical data;

receive, via a client computing device, one or both of (i) task completion information, and (ii) session completion information;

update at least one skill node in the skill graph corresponding to the fellow by analyzing the one or both of (i) the task completion information, and (ii) the session completion information;

determine a match between an attempted skill and at least one node in the skill graph corresponding to the fellow;

update a first rating of the at least one node in the skill graph according to the fellow's success or failure regarding the attempted skill, wherein the update is performed using a modified Elo rating system;

traverse the skill graph to a parent node of the at least one skill node;

propagate a respective update to a second rating of the parent node according to at least one of i) a respective decaying relevance value established by a predetermined global value or a respective per-edge value or ii) a factor multiplier;

select, when the synchronous calendar object includes at least one free block of time, at least one skill;

generate a target skill level;

select one or more nodes from a curriculum graph proximate in rating to the generated target skill level;

compute a cost of the one or more selected nodes; and assign the node with the highest value per cost to the synchronous calendar object.

* * * * *